United States Patent [19]

Shores

[11] Patent Number: 5,194,996
[45] Date of Patent: Mar. 16, 1993

[54] DIGITAL AUDIO RECORDING FORMAT FOR MOTION PICTURE FILM

[75] Inventor: Kenneth D. Shores, Los Angeles, Calif.

[73] Assignee: Optical Radiation Corporation, Azusa, Calif.

[21] Appl. No.: 510,288

[22] Filed: Apr. 16, 1990

[51] Int. Cl.⁵ ............................................... G11B 5/09
[52] U.S. Cl. ........................................ 360/48; 360/2
[58] Field of Search .................... 352/236; 360/32, 48, 360/3

[56] References Cited

U.S. PATENT DOCUMENTS

| | | |
|---|---|---|
| 3,639,054 | 2/1972 | Haefeli . |
| 3,804,497 | 4/1974 | Ogiso et al. . |
| 3,820,881 | 6/1974 | Friesen . |
| 3,850,513 | 11/1974 | Wray . |
| 3,897,999 | 8/1975 | Alabone . |
| 3,932,032 | 1/1976 | Weinstein . |
| 3,969,593 | 7/1976 | Vlahos . |
| 4,029,405 | 6/1977 | Stutz . |
| 4,032,224 | 6/1977 | Wray . |
| 4,070,106 | 1/1978 | Saito . |
| 4,075,018 | 2/1978 | Custer . |
| 4,124,784 | 11/1978 | Johnson et al. . |
| 4,139,382 | 2/1979 | Stephens . |
| 4,148,567 | 4/1979 | Suzaki et al. . |
| 4,184,055 | 1/1980 | Dolby . |
| 4,256,389 | 3/1981 | Engebretson . |
| 4,306,781 | 12/1981 | Mosely . |
| 4,308,327 | 12/1981 | Bird et al. . |
| 4,355,383 | 10/1982 | Dolby . |
| 4,366,217 | 12/1982 | Bird et al. . |
| 4,370,035 | 1/1983 | Stella . |
| 4,385,814 | 5/1983 | Elliott . |
| 4,461,552 | 7/1984 | Levine . |
| 4,509,061 | 4/1985 | Nomoto et al. . |
| 4,551,827 | 11/1985 | Custer et al. . |
| 4,577,302 | 3/1986 | Allen . |
| 4,591,248 | 5/1986 | Freeman . |
| 4,600,280 | 7/1986 | Clark . |
| 4,603,099 | 7/1986 | Drexler . |
| 4,672,480 | 6/1987 | Yamamoto ............................ 360/32 |
| 4,707,818 | 11/1987 | Suzuki et al. . |
| 4,800,550 | 1/1989 | Yamauchi . |
| 4,893,921 | 1/1990 | Beauviala . |

FOREIGN PATENT DOCUMENTS

| | | |
|---|---|---|
| 0316063 | 5/1989 | European Pat. Off. . |
| 0321314 | 6/1989 | European Pat. Off. . |
| 2061575 | 5/1981 | United Kingdom . |

*Primary Examiner*—Vincent P. Canney
*Attorney, Agent, or Firm*—Christie, Parker & Hale

[57] ABSTRACT

A digitally-sound-encoded filmstrip has digital data recorded along the length of a soundtrack, said data being representative of a particular data format. The data format has a plurality of data fields which are filled with data representing sound values and other digital information. Each data field has redundant data to enable the detection and correction of data in the data field upon decoding of the formatted data. The data format also features a plurality of data blocks wherein each data block is made up of a group of data fields wherein at least one data field contains data redundant to the entire data block to enable the detection of errors made in correction of errors in the individual data fields. Successive sound samples are recorded in mutually remote locations along the length of the soundtrack. This interleave of the sound samples is accomplished by periodically storing consecutive sound samples in consecutive memory locations of a memory device and then accessing the samples, in the required interleaved order, from the memory device.

5 Claims, 28 Drawing Sheets

| | A | B | C | D | E | F | G | H |
|---|---|---|---|---|---|---|---|---|
| 1 | Sy-5(0) | Sy-4(0) | Sy-3(0) | Sy-2(1) | Sy-1(1) | Sy-0(1) | | Sync(0) |
| 2 | Cf-A(0) | Rf(1) | Frame | Mark | Cnt-23 | Cnt-22 | | A |
| 3 | Cf-B(0) | Cnt-21 | Cnt-20 | Cnt-19 | Cnt-18 | Cnt-17 | | B |
| 4 | Cf-C(0) | Cnt-16 | Cnt-15 | Cnt-14 | Cnt-13 | Cnt-12 | | C |
| 5 | Cnt-11 | Cnt-10 | Cnt-9 | Cnt-8 | Cnt-7 | Cnt-6 | | A |
| 6 | Cnt-5 | Cnt-4 | Cnt-3 | Cnt-2 | Cnt-1 | Cnt-0 | | B |
| 7 | Sub0 | SA0-15 | SA0-14 | SA0-13 | SA0-12 | SA0-11 | | C |
| 8 | SA0-10 | SA0-9 | SA0-8 | SA0-7 | SA0-6 | SA0-5 | | A |
| 9 | SA0-4 | SA0-3 | SA0-2 | SA0-1 | SA0-0 | SB0-15 | | B |
| 10 | SB0-14 | SB0-13 | SB0-12 | SB0-11 | SB0-10 | SB0-9 | | C |
| 11 | SB0-8 | SB0-7 | SB0-6 | SB0-5 | SB0-4 | SB0-3 | | A |
| 12 | SB0-2 | SB0-1 | SB0-0 | SC0-15 | SC0-14 | SC0-13 | | B |
| 13 | SC0-12 | SC0-11 | SC0-10 | SC0-9 | SC0-8 | SC0-7 | | C |
| 14 | SC0-6 | SC0-5 | SC0-4 | SC0-3 | SC0-2 | SC0-1 | | A |
| 15 | SC0-0 | SD0-15 | SD0-14 | SD0-13 | SD0-12 | SD0-11 | | B |
| 16 | SD0-10 | SD0-9 | SD0-8 | SD0-7 | SD0-6 | SD0-5 | | C |
| 17 | SD0-4 | SD0-3 | SD0-2 | SD0-1 | SD0-0 | SE0-15 | | A |
| 18 | SE0-14 | SE0-13 | SE0-12 | SE0-11 | SE0-10 | SE0-9 | | B |
| 19 | SE0-8 | SE0-7 | SE0-6 | SE0-5 | SE0-4 | SE0-3 | | C |
| 20 | SE0-2 | SE0-1 | SE0-0 | SF0-15 | SF0-14 | SF0-13 | | A |
| 21 | SF0-12 | SF0-11 | SF0-10 | SF0-9 | SF0-8 | SF0-7 | | B |

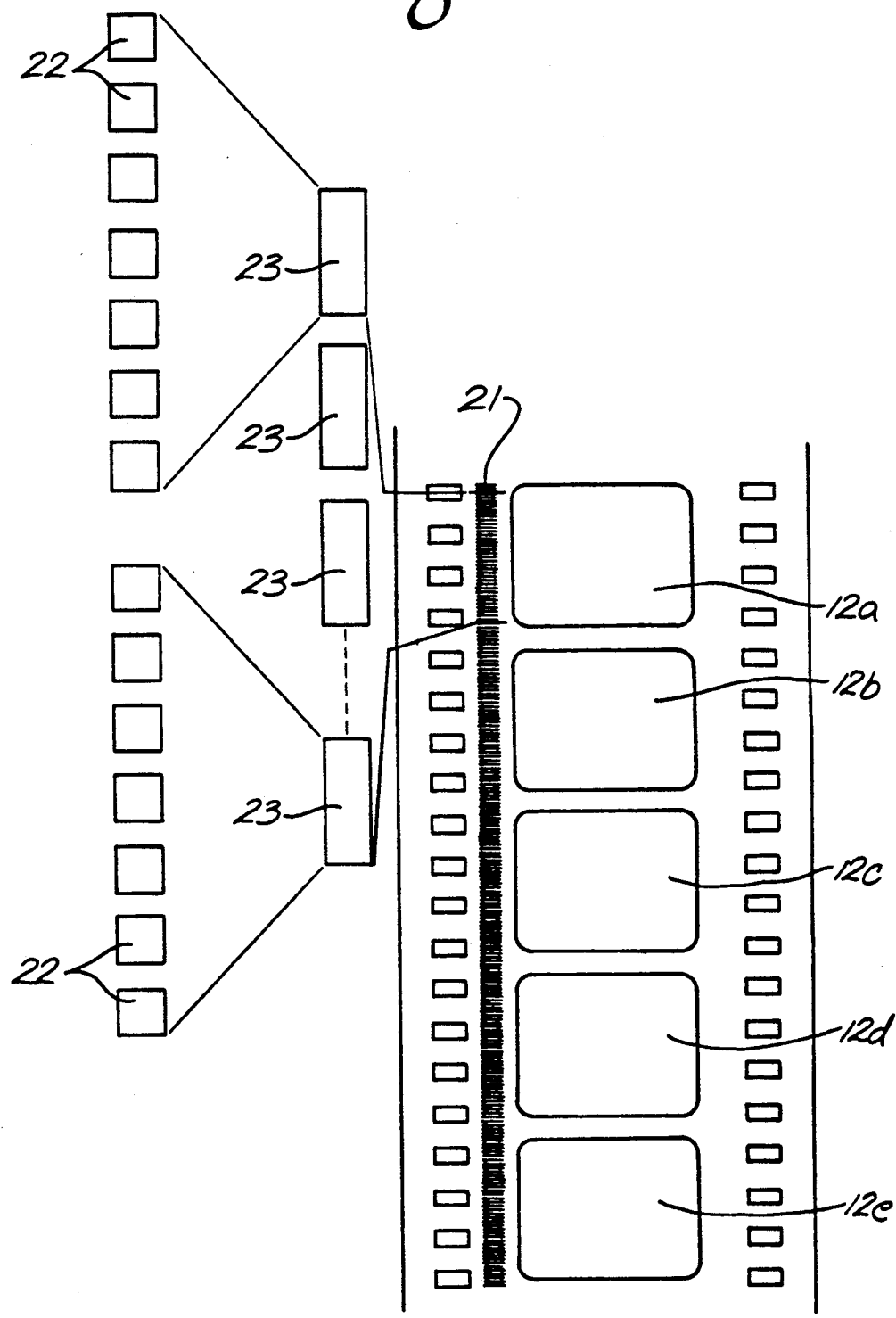

Fig. 3a

| | A | B | C | D | E | F | G | H |
|---|---|---|---|---|---|---|---|---|
| 1 | Sy-5(0) | Sy-4(0) | Sy-3(0) | Sy-2(1) | Sy-1(1) | Sy-0(1) | | Sync(0) |
| 2 | Cf-A(0) | Rf(1) | Frame | Mark | Cnt-23 | Cnt-22 | | A |
| 3 | Cf-B(0) | Cnt-21 | Cnt-20 | Cnt-19 | Cnt-18 | Cnt-17 | | B |
| 4 | Cf-C(0) | Cnt-16 | Cnt-15 | Cnt-14 | Cnt-13 | Cnt-12 | | C |
| 5 | Cnt-11 | Cnt-10 | Cnt-9 | Cnt-8 | Cnt-7 | Cnt-6 | | A |
| 6 | Cnt-5 | Cnt-4 | Cnt-3 | Cnt-2 | Cnt-1 | Cnt-0 | | B |
| 7 | Sub0 | SA0-15 | SA0-14 | SA0-13 | SA0-12 | SA0-11 | | C |
| 8 | SA0-10 | SA0-9 | SA0-8 | SA0-7 | SA0-6 | SA0-5 | | A |
| 9 | SA0-4 | SA0-3 | SA0-2 | SA0-1 | SA0-0 | SB0-15 | | B |
| 10 | SB0-14 | SB0-13 | SB0-12 | SB0-11 | SB0-10 | SB0-9 | | C |
| 11 | SB0-8 | SB0-7 | SB0-6 | SB0-5 | SB0-4 | SB0-3 | | A |
| 12 | SB0-2 | SB0-1 | SB0-0 | SC0-15 | SC0-14 | SC0-13 | | B |
| 13 | SC0-12 | SC0-11 | SC0-10 | SC0-9 | SC0-8 | SC0-7 | | C |
| 14 | SC0-6 | SC0-5 | SC0-4 | SC0-3 | SC0-2 | SC0-1 | | A |
| 15 | SC0-0 | SD0-15 | SD0-14 | SD0-13 | SD0-12 | SD0-11 | | B |
| 16 | SD0-10 | SD0-9 | SD0-8 | SD0-7 | SD0-6 | SD0-5 | | C |
| 17 | SD0-4 | SD0-3 | SD0-2 | SD0-1 | SD0-0 | SE0-15 | | A |
| 18 | SE0-14 | SE0-13 | SE0-12 | SE0-11 | SE0-10 | SE0-9 | | B |
| 19 | SE0-8 | SE0-7 | SE0-6 | SE0-5 | SE0-4 | SE0-3 | | C |
| 20 | SE0-2 | SE0-1 | SE0-0 | SF0-15 | SF0-14 | SF0-13 | | A |
| 21 | SF0-12 | SF0-11 | SF0-10 | SF0-9 | SF0-8 | SF0-7 | | B |

Fig. 36

| | A | B | C | D | E | F | G | H |
|---|---|---|---|---|---|---|---|---|
| 22 | SF0-6 | SF0-5 | SF0-4 | SF0-3 | SF0-2 | SF0-1 | | C |
| 23 | SF0-0 | Sub1 | DA1-11 | DA1-10 | DA1-9 | DA1-8 | | A |
| 24 | DA1-7 | DA1-6 | DA1-5 | DA1-4 | DA1-3 | DA1-2 | | B |
| 25 | DA1-1 | DA1-0 | DB1-11 | DB1-10 | DB1-9 | DB1-8 | | C |
| 26 | DB1-7 | DB1-6 | DB1-5 | DB1-4 | DB1-3 | DB1-2 | | A |
| 27 | DB1-1 | DB1-0 | DC1-11 | DC1-10 | DC1-9 | DC1-8 | | B |
| 28 | DC1-7 | DC1-6 | DC1-5 | DC1-4 | DC1-3 | DC1-2 | | C |
| 29 | DC1-1 | DC1-0 | DD1-11 | DD1-10 | DD1-9 | DD1-8 | | A |
| 30 | DD1-7 | DD1-6 | DD1-5 | DD1-4 | DD1-3 | DD1-2 | | B |
| 31 | DD1-1 | DD1-0 | DE1-11 | DE1-10 | DE1-9 | DE1-8 | | C |
| 32 | DE1-7 | DE1-6 | DE1-5 | DE1-4 | DE1-3 | DE1-2 | | A |
| 33 | DE1-1 | DE1-0 | Sub2 | DA2-11 | DA2-10 | DA2-9 | | B |
| 34 | DA2-8 | DA2-7 | DA2-6 | DA2-5 | DA2-4 | DA2-3 | | C |
| 35 | DA2-2 | DA2-1 | DA2-0 | DB2-11 | DB2-10 | DB2-9 | | A |
| 36 | DB2-8 | DB2-7 | DB2-6 | DB2-5 | DB2-4 | DB2-3 | | B |
| 37 | DB2-2 | DB2-1 | DB2-0 | DC2-11 | DC2-10 | DC2-9 | | C |
| 38 | DC2-8 | DC2-7 | DC2-6 | DC2-5 | DC2-4 | DC2-3 | | A |
| 39 | DC2-2 | DC2-1 | DC2-0 | DD2-11 | DD2-10 | DD2-9 | | B |
| 40 | DD2-8 | DD2-7 | DD2-6 | DD2-5 | DD2-4 | DD2-3 | | C |
| 41 | DD2-2 | DD2-1 | DD2-0 | DE2-11 | DE2-10 | DE2-9 | | A |

Fig. 3C

| | A | B | C | D | E | F | G | H |
|---|---|---|---|---|---|---|---|---|
| 42 | DE2-8 | DE2-7 | DE2-6 | DE2-5 | DE2-4 | DE2-3 | | B |
| 43 | DE2-2 | DE2-1 | DE2-0 | Sub3 | DA3-11 | DA3-10 | | C |
| 44 | DA3-9 | DA3-8 | DA3-7 | DA3-6 | DA3-5 | DA3-4 | | A |
| 45 | DA3-3 | DA3-2 | DA3-1 | DA3-0 | DB3-11 | DB3-10 | | B |
| 46 | DB3-9 | DB3-8 | DB3-7 | DB3-6 | DB3-5 | DB3-4 | | C |
| 47 | DB3-3 | DB3-2 | DB3-1 | DB3-0 | DC3-11 | DC3-10 | | A |
| 48 | DC3-9 | DC3-8 | DC3-7 | DC3-6 | DC3-5 | DC3-4 | | B |
| 49 | DC3-3 | DC3-2 | DC3-1 | DC3-0 | DD3-11 | DD3-10 | | C |
| 50 | DD3-9 | DD3-8 | DD3-7 | DD3-6 | DD3-5 | DD3-4 | | A |
| 51 | Rs0-5 | Rs0-4 | Rs0-3 | Rs0-2 | Rs0-1 | Rs0-0 | | B |
| 52 | Rs1-5 | Rs1-4 | Rs1-3 | Rs1-2 | Rs1-1 | Rs1-0 | | C |
| 53 | Rs2-5 | Rs2-4 | Rs2-3 | Rs2-2 | Rs2-1 | Rs2-0 | | A |
| 54 | Rs3-5 | Rs3-4 | Rs3-3 | Rs3-2 | Rs3-1 | Rs3-0 | | B |
| 55 | Rs4-5 | Rs4-4 | Rs4-3 | Rs4-2 | Rs4-1 | Rs4-0 | | C |
| 56 | Rs5-5 | Rs5-4 | Rs5-3 | Rs5-2 | Rs5-1 | Rs5-0 | | A |
| 57 | Rs6-5 | Rs6-4 | Rs6-3 | Rs6-2 | Rs6-1 | Rs6-0 | | B |
| 58 | Rs7-5 | Rs7-4 | Rs7-3 | Rs7-2 | Rs7-1 | Rs7-0 | | C |
| 59 | Rs8-5 | Rs8-4 | Rs8-3 | Rs8-2 | Rs8-1 | Rs8-0 | | A |
| 60 | Rs9-5 | Rs9-4 | Rs9-3 | Rs9-2 | Rs9-1 | Rs9-0 | | B |
| 61 | Rs10-5 | Rs10-4 | Rs10-3 | Rs10-2 | Rs10-1 | Rs10-0 | | C |
| 62 | Rs11-5 | Rs11-4 | Rs11-3 | Rs11-2 | Rs11-1 | Rs11-0 | | A |
| 63 | Rs12-5 | Rs12-4 | Rs12-3 | Rs12-2 | Rs12-1 | Rs12-0 | | B |
| 64 | Rs13-5 | Rs13-4 | Rs13-3 | Rs13-2 | Rs13-1 | Rs13-0 | | C |

| | A | B | C | D | E | F | G | H |
|---|---|---|---|---|---|---|---|---|
| 65 | Sy-5(0) | Sy-4(0) | Sy-3(0) | Sy-2(1) | Sy-1(1) | Sy-0(1) | | Sync(1) |
| 66 | Cf-A(0) | Rf(0) | DD3-3 | DD3-2 | DD3-1 | DD3-0 | | A |
| 67 | Cf-B(0) | DE3-11 | DE3-10 | DE3-9 | DE3-8 | DE3-7 | | B |
| 68 | Cf-C(0) | DE3-6 | DE3-5 | DE3-4 | DE3-3 | DE3-2 | | C |
| 69 | DE3-1 | DE3-0 | Sub4 | DA4-11 | DA4-10 | DA4-9 | | A |
| 70 | DA4-8 | DA4-7 | DA4-6 | DA4-5 | DA4-4 | DA4-3 | | B |
| 71 | DA4-2 | DA4-1 | DA4-0 | DB4-11 | DB4-10 | DB4-9 | | C |
| 72 | DB4-8 | DB4-7 | DB4-6 | DB4-5 | DB4-4 | DB4-3 | | A |
| 73 | DB4-2 | DB4-1 | DB4-0 | DC4-11 | DC4-10 | DC4-9 | | B |
| 74 | DC4-8 | DC4-7 | DC4-6 | DC4-5 | DC4-4 | DC4-3 | | C |
| 75 | DC4-2 | DC4-1 | DC4-0 | DD4-11 | DD4-10 | DD4-9 | | A |
| 76 | DD4-8 | DD4-7 | DD4-6 | DD4-5 | DD4-4 | DD4-3 | | B |
| 77 | DD4-2 | DD4-1 | DD4-0 | DE4-11 | DE4-10 | DE4-9 | | C |
| 78 | DE4-8 | DE4-7 | DE4-6 | DE4-5 | DE4-4 | DE4-3 | | A |
| 79 | DE4-2 | DE4-1 | DE4-0 | Sub5 | DA5-11 | DA5-10 | | B |
| 80 | DA5-9 | DA5-8 | DA5-7 | DA5-6 | DA5-5 | DA5-4 | | C |
| 81 | DA5-3 | DA5-2 | DA5-1 | DA5-0 | DB5-11 | DB5-10 | | A |
| 82 | DB5-9 | DB5-8 | DB5-7 | DB5-6 | DB5-5 | DB5-4 | | B |
| 83 | DB5-3 | DB5-2 | DB5-1 | DB5-0 | DC5-11 | DC5-10 | | C |
| 84 | DC5-9 | DC5-8 | DC5-7 | DC5-6 | DC5-5 | DC5-4 | | A |

|   | A | B | C | D | E | F | G | H |
|---|---|---|---|---|---|---|---|---|
| 85 | DC5-3 | DC5-2 | DC5-1 | DC5-0 | DD5-11 | DD5-10 | | B |
| 86 | DD5-9 | DD5-8 | DD5-7 | DD5-6 | DD5-5 | DD5-4 | | C |
| 87 | DD5-3 | DD5-2 | DD5-1 | DD5-0 | DE5-11 | DE5-10 | | A |
| 88 | DE5-9 | DE5-8 | DE5-7 | DE5-6 | DE5-5 | DE5-4 | | B |
| 89 | DE5-3 | DE5-2 | DE5-1 | DE5-0 | Sub6 | DA6-11 | | C |
| 90 | DA6-10 | DA6-9 | DA6-8 | DA6-7 | DA6-6 | DA6-5 | | A |
| 91 | DA6-4 | DA6-3 | DA6-2 | DA6-1 | DA6-0 | DB6-11 | | B |
| 92 | DB6-10 | DB6-9 | DB6-8 | DB6-7 | DB6-6 | DB6-5 | | C |
| 93 | DB6-4 | DB6-3 | DB6-2 | DB6-1 | DB6-0 | DC6-11 | | A |
| 94 | DC6-10 | DC6-9 | DC6-8 | DC6-7 | DC6-6 | DC6-5 | | B |
| 95 | DC6-4 | DC6-3 | DC6-2 | DC6-1 | DC6-0 | DD6-11 | | C |
| 96 | DD6-10 | DD6-9 | DD6-8 | DD6-7 | DD6-6 | DD6-5 | | A |
| 97 | DD6-4 | DD6-3 | DD6-2 | DD6-1 | DD6-0 | DE6-11 | | B |
| 98 | DE6-10 | DE6-9 | DE6-8 | DE6-7 | DE6-6 | DE6-5 | | C |
| 99 | DE6-4 | DE6-3 | DE6-2 | DE6-1 | DE6-0 | Sub7 | | A |
| 100 | DA7-11 | DA7-10 | DA7-9 | DA7-8 | DA7-7 | DA7-6 | | B |
| 101 | DA7-5 | DA7-4 | DA7-3 | DA7-2 | DA7-1 | DA7-0 | | C |
| 102 | DB7-11 | DB7-10 | DB7-9 | DB7-8 | DB7-7 | DB7-6 | | A |
| 103 | DB7-5 | DB7-4 | DB7-3 | DB7-2 | DB7-1 | DB7-0 | | B |
| 104 | DC7-11 | DC7-10 | DC7-9 | DC7-8 | DC7-7 | DC7-6 | | C |
| 105 | DC7-5 | DC7-4 | DC7-3 | DC7-2 | DC7-1 | DC7-0 | | A |
| 106 | DD7-11 | DD7-10 | DD7-9 | DD7-8 | DD7-7 | DD7-6 | | B |

| | A | B | C | D | E | F | G | H |
|---|---|---|---|---|---|---|---|---|
| 107 | DD7-5 | DD7-4 | DD7-3 | DD7-2 | DD7-1 | DD7-0 | | C |
| 108 | DE7-11 | DE7-10 | DE7-9 | DE7-8 | DE7-7 | DE7-6 | | A |
| 109 | DE7-5 | DE7-4 | DE7-3 | DE7-2 | DE7-1 | DE7-0 | | B |
| 110 | Sub8 | DA8-11 | DA8-10 | DA8-9 | DA8-8 | DA8-7 | | C |
| 111 | DA8-6 | DA8-5 | DA8-4 | DA8-3 | DA8-2 | DA8-1 | | A |
| 112 | DA8-0 | DB8-11 | DB8-10 | DB8-9 | DB8-8 | DB8-7 | | B |
| 113 | DB8-6 | DB8-5 | DB8-4 | DB8-3 | DB8-2 | DB8-1 | | C |
| 114 | DB8-0 | DC8-11 | DC8-10 | DC8-9 | DC8-8 | DC8-7 | | A |
| 115 | Rs0-5 | Rs0-4 | Rs0-3 | Rs0-2 | Rs0-1 | Rs0-0 | | B |
| 116 | Rs1-5 | Rs1-4 | Rs1-3 | Rs1-2 | Rs1-1 | Rs1-0 | | C |
| 117 | Rs2-5 | Rs2-4 | Rs2-3 | Rs2-2 | Rs2-1 | Rs2-0 | | A |
| 118 | Rs3-5 | Rs3-4 | Rs3-3 | Rs3-2 | Rs3-1 | Rs3-0 | | B |
| 119 | Rs4-5 | Rs4-4 | Rs4-3 | Rs4-2 | Rs4-1 | Rs4-0 | | C |
| 120 | Rs5-5 | Rs5-4 | Rs5-3 | Rs5-2 | Rs5-1 | Rs5-0 | | A |
| 121 | Rs6-5 | Rs6-4 | Rs6-3 | Rs6-2 | Rs6-1 | Rs6-0 | | B |
| 122 | Rs7-5 | Rs7-4 | Rs7-3 | Rs7-2 | Rs7-1 | Rs7-0 | | C |
| 123 | Rs8-5 | Rs8-4 | Rs8-3 | Rs8-2 | Rs8-1 | Rs8-0 | | A |
| 124 | Rs9-5 | Rs9-4 | Rs9-3 | Rs9-2 | Rs9-1 | Rs9-0 | | B |
| 125 | Rs10-5 | Rs10-4 | Rs10-3 | Rs10-2 | Rs10-1 | Rs10-0 | | C |
| 126 | Rs11-5 | Rs11-4 | Rs11-3 | Rs11-2 | Rs11-1 | Rs11-0 | | A |
| 127 | Rs12-5 | Rs12-4 | Rs12-3 | Rs12-2 | Rs12-1 | Rs12-0 | | B |
| 128 | Rs13-5 | Rs13-4 | Rs13-3 | Rs13-2 | Rs13-1 | Rs13-0 | | C |

Fig. 4c

|     | A       | B       | C       | D       | E       | F       | G | H       |
|-----|---------|---------|---------|---------|---------|---------|---|---------|
|     |         |         |         |         |         |         |   | Sync(2) |
|     | Sy-5(0) | Sy-4(0) | Sy-3(0) | Sy-2(1) | Sy-1(1) | Sy-0(1) |   |         |
| 129 | Cf-A(0) | Rf(0)   | DC8-6   | DC8-5   | DC8-4   | DC8-3   |   | A       |
| 130 | Cf-B(0) | DC8-2   | DC8-1   | DC8-0   | DD8-11  | DD8-10  |   | B       |
| 131 | Cf-C(0) | DD8-9   | DD8-8   | DD8-7   | DD8-6   | DD8-5   |   | C       |
| 132 | DD8-4   | DD8-3   | DD8-2   | DD8-1   | DD8-0   | DE8-11  |   | A       |
| 133 | DE8-10  | DE8-9   | DE8-8   | DE8-7   | DE8-6   | DE8-5   |   | B       |
| 134 | DE8-4   | DE8-3   | DE8-2   | DE8-1   | DE8-0   | Sub9    |   | C       |
| 135 | DA9-11  | DA9-10  | DA9-9   | DA9-8   | DA9-7   | DA9-6   |   | A       |
| 136 | DA9-5   | DA9-4   | DA9-3   | DA9-2   | DA9-1   | DA9-0   |   | B       |
| 137 | DB9-11  | DB9-10  | DB9-9   | DB9-8   | DB9-7   | DB9-6   |   | C       |
| 138 | DB9-5   | DB9-4   | DB9-3   | DB9-2   | DB9-1   | DB9-0   |   | A       |
| 139 | DC9-11  | DC9-10  | DC9-9   | DC9-8   | DC9-7   | DC9-6   |   | B       |
| 140 | DC9-5   | DC9-4   | DC9-3   | DC9-2   | DC9-1   | DC9-0   |   | C       |
| 141 | DD9-11  | DD9-10  | DD9-9   | DD9-8   | DD9-7   | DD9-6   |   | A       |
| 142 | DD9-5   | DD9-4   | DD9-3   | DD9-2   | DD9-1   | DD9-0   |   | B       |
| 143 | DE9-11  | DE9-10  | DE9-9   | DE9-8   | DE9-7   | DE9-6   |   | C       |
| 144 | DE9-5   | DE9-4   | DE9-3   | DE9-2   | DE9-1   | DE9-0   |   | A       |
| 145 | Sub10   | DA10-11 | DA10-10 | DA10-9  | DA10-8  | DA10-7  |   | B       |
| 146 | DA10-6  | DA10-5  | DA10-4  | DA10-3  | DA10-2  | DA10-1  |   | C       |
| 147 | DA10-0  | DB10-11 | DB10-10 | DB10-9  | DB10-8  | DB10-7  |   | A       |
| 148 | DB10-6  | DB10-5  | DB10-4  | DB10-3  | DB10-2  | DB10-1  |   | B       |

|  | A | B | C | D | E | F | G | H |
|---|---|---|---|---|---|---|---|---|
| 150 | DB10-0 | DC10-11 | DC10-10 | DC10-9 | DC10-8 | DC10-7 |  | C |
| 151 | DC10-6 | DC10-5 | DC10-4 | DC10-3 | DC10-2 | DC10-1 |  | A |
| 152 | DC10-0 | DD10-11 | DD10-10 | DD10-9 | DD10-8 | DD10-7 |  | B |
| 153 | DD10-6 | DD10-5 | DD10-4 | DD10-3 | DD10-2 | DD10-1 |  | C |
| 154 | DD10-0 | DE10-11 | DE10-10 | DE10-9 | DE10-8 | DE10-7 |  | A |
| 155 | DE10-6 | DE10-5 | DE10-4 | DE10-3 | DE10-2 | DE10-1 |  | B |
| 156 | DE10-0 | Sub11 | DA11-11 | DA11-10 | DA11-9 | DA11-8 |  | C |
| 157 | DA11-7 | DA11-6 | DA11-5 | DA11-4 | DA11-3 | DA11-2 |  | A |
| 158 | DA11-1 | DA11-0 | DB11-11 | DB11-10 | DB11-9 | DB11-8 |  | B |
| 159 | DB11-7 | DB11-6 | DB11-5 | DB11-4 | DB11-3 | DB11-2 |  | C |
| 160 | DB11-1 | DC11-0 | DC11-11 | DC11-10 | DC11-9 | DC11-8 |  | A |
| 161 | DC11-7 | DC11-6 | DC11-5 | DC11-4 | DC11-3 | DC11-2 |  | B |
| 162 | DC11-1 | DD11-0 | DD11-11 | DD11-10 | DD11-9 | DD11-8 |  | C |
| 163 | DD11-7 | DD11-6 | DD11-5 | DD11-4 | DD11-3 | DD11-2 |  | A |
| 164 | DD11-1 | DE11-0 | DE11-11 | DE11-10 | DE11-9 | DE11-8 |  | B |
| 165 | DE11-7 | DE11-6 | DE11-5 | DE11-4 | DE11-3 | DE11-2 |  | C |
| 166 | DE11-1 | DE11-0 | Sub12 | DA12-11 | DA12-10 | DA12-9 |  | A |
| 167 | DA12-8 | DA12-7 | DA12-6 | DA12-5 | DA12-4 | DA12-3 |  | B |
| 168 | DA12-2 | DA12-1 | DA12-0 | DB12-11 | DB12-10 | DB12-9 |  | C |
| 169 | DB12-8 | DB12-7 | DB12-6 | DB12-5 | DB12-4 | DB12-3 |  | A |
| 170 | DB12-2 | DB12-1 | DB12-0 | DC12-11 | DC12-10 | DC12-9 |  | B |
| 171 | DC12-8 | DC12-7 | DC12-6 | DC12-5 | DC12-4 | DC12-3 |  | C |

Fig. 5c

| | A | B | C | D | E | F | G | H |
|---|---|---|---|---|---|---|---|---|
| 172 | DC12-2 | DC12-1 | DC12-0 | DD12-11 | DD12-10 | DD12-9 | | A |
| 173 | DD12-8 | DD12-7 | DD12-6 | DD12-5 | DD12-4 | DD12-3 | | B |
| 174 | DD12-2 | DD12-1 | DD12-0 | DE12-11 | DE12-10 | DE12-9 | | C |
| 175 | DE12-8 | DE12-7 | DE12-6 | DE12-5 | DE12-4 | DE12-3 | | A |
| 176 | DE12-2 | DE12-1 | DE12-0 | Sub13 | DA13-11 | DA13-10 | | B |
| 177 | DA13-9 | DA13-8 | DA13-7 | DA13-6 | DA13-5 | DA13-4 | | C |
| 178 | DA13-3 | DA13-2 | DA13-1 | DA13-0 | DB13-11 | DB13-10 | | A |
| 179 | Rs0-5 | Rs0-4 | Rs0-3 | Rs0-2 | Rs0-1 | Rs0-0 | | B |
| 180 | Rs1-5 | Rs1-4 | Rs1-3 | Rs1-2 | Rs1-1 | Rs1-0 | | C |
| 181 | Rs2-5 | Rs2-4 | Rs2-3 | Rs2-2 | Rs2-1 | Rs2-0 | | A |
| 182 | Rs3-5 | Rs3-4 | Rs3-3 | Rs3-2 | Rs3-1 | Rs3-0 | | B |
| 183 | Rs4-5 | Rs4-4 | Rs4-3 | Rs4-2 | Rs4-1 | Rs4-0 | | C |
| 184 | Rs5-5 | Rs5-4 | Rs5-3 | Rs5-2 | Rs5-1 | Rs5-0 | | A |
| 185 | Rs6-5 | Rs6-4 | Rs6-3 | Rs6-2 | Rs6-1 | Rs6-0 | | B |
| 186 | Rs7-5 | Rs7-4 | Rs7-3 | Rs7-2 | Rs7-1 | Rs7-0 | | C |
| 187 | Rs8-5 | Rs8-4 | Rs8-3 | Rs8-2 | Rs8-1 | Rs8-0 | | A |
| 188 | Rs9-5 | Rs9-4 | Rs9-3 | Rs9-2 | Rs9-1 | Rs9-0 | | B |
| 189 | Rs10-5 | Rs10-4 | Rs10-3 | Rs10-2 | Rs10-1 | Rs10-0 | | C |
| 190 | Rs11-5 | Rs11-4 | Rs11-3 | Rs11-2 | Rs11-1 | Rs11-0 | | A |
| 191 | Rs12-5 | Rs12-4 | Rs12-3 | Rs12-2 | Rs12-1 | Rs12-0 | | B |
| 192 | Rs13-5 | Rs13-4 | Rs13-3 | Rs13-2 | Rs13-1 | Rs13-0 | | C |

Fig. 6a

| | A | B | C | D | E | F | G | H |
|---|---|---|---|---|---|---|---|---|
| 193 | Sy-5(0) | Sy-4(0) | Sy-3(0) | Sy-2(1) | Sy-1(1) | Sy-0(1) | | Sync(3) |
| 194 | Cf-A(0) | Rf(0) | DB13-9 | DB13-8 | DB13-7 | DB13-6 | | A |
| 195 | Cf-B(0) | DB13-5 | DB13-4 | DB13-3 | DB13-2 | DB13-1 | | B |
| 196 | Cf-C(0) | DB13-0 | DC13-11 | DC13-10 | DC13-9 | DC13-8 | | C |
| 197 | DC13-7 | DC13-6 | DC13-5 | DC13-4 | DC13-3 | DC13-2 | | A |
| 198 | DC13-1 | DC13-0 | DD13-11 | DD13-10 | DD13-9 | DD13-8 | | B |
| 199 | DD13-7 | DD13-6 | DD13-5 | DD13-4 | DD13-3 | DD13-2 | | C |
| 200 | DD13-1 | DD13-0 | DE13-11 | DE13-10 | DE13-9 | DE13-8 | | A |
| 201 | DE13-7 | DE13-6 | DE13-5 | DE13-4 | DE13-3 | DE13-2 | | B |
| 202 | DE13-1 | DE13-0 | Sub14 | DA14-11 | DA14-10 | DA14-9 | | C |
| 203 | DA14-8 | DA14-7 | DA14-6 | DA14-5 | DA14-4 | DA14-3 | | A |
| 204 | DA14-2 | DA14-1 | DA14-0 | DB14-11 | DB14-10 | DB14-9 | | B |
| 205 | DB14-8 | DB14-7 | DB14-6 | DB14-5 | DB14-4 | DB14-3 | | C |
| 206 | DB14-2 | DB14-1 | DB14-0 | DC14-11 | DC14-10 | DC14-9 | | A |
| 207 | DC14-8 | DC14-7 | DC14-6 | DC14-5 | DC14-4 | DC14-3 | | B |
| 208 | DC14-2 | DC14-1 | DC14-0 | DD14-11 | DD14-10 | DD14-9 | | C |
| 209 | DD14-8 | DD14-7 | DD14-6 | DD14-5 | DD14-4 | DD14-3 | | A |
| 210 | DD14-2 | DD14-1 | DD14-0 | DE14-11 | DE14-10 | DE14-9 | | B |
| 211 | DE14-8 | DE14-7 | DE14-6 | DE14-5 | DE14-4 | DE14-3 | | C |
| 212 | DE14-2 | DE14-1 | DE14-0 | Sub15 | DA15-11 | DA15-10 | | A |
| 213 | DA15-9 | DA15-8 | DA15-7 | DA15-6 | DA15-5 | DA15-4 | | B |
| 214 | DA15-3 | DA15-2 | DA15-1 | DA15-0 | DB15-11 | DB15-10 | | C |

| | A | B | C | D | E | F | G | H |
|---|---|---|---|---|---|---|---|---|
| 215 | DB15-9 | DB15-8 | DB15-7 | DB15-6 | DB15-5 | DB15-4 | | A |
| 216 | DB15-3 | DB15-2 | DB15-1 | DB15-0 | DC15-11 | DC15-10 | | B |
| 217 | DC15-9 | DC15-8 | DC15-7 | DC15-6 | DC15-5 | DC15-4 | | C |
| 218 | DC15-3 | DC15-2 | DC15-1 | DC15-0 | DD15-11 | DD15-10 | | A |
| 219 | DD15-9 | DD15-8 | DD15-7 | DD15-6 | DD15-5 | DD15-4 | | B |
| 220 | DD15-3 | DD15-2 | DD15-1 | DD15-0 | DE15-11 | DE15-10 | | C |
| 221 | DE15-9 | DE15-8 | DE15-7 | DE15-6 | DE15-5 | DE15-4 | | A |
| 222 | DE15-3 | DE15-2 | DE15-1 | DE15-0 | Sub16 | DA16-11 | | B |
| 223 | DA16-10 | DA16-9 | DA16-8 | DA16-7 | DA16-6 | DA16-5 | | C |
| 224 | DA16-4 | DA16-3 | DA16-2 | DA16-1 | DA16-0 | DB16-11 | | A |
| 225 | DB16-10 | DB16-9 | DB16-8 | DB16-7 | DB16-6 | DB16-5 | | B |
| 226 | DB16-4 | DB16-3 | DB16-2 | DB16-1 | DB16-0 | DC16-11 | | C |
| 227 | DC16-10 | DC16-9 | DC16-8 | DC16-7 | DC16-6 | DC16-5 | | A |
| 228 | DC16-4 | DC16-3 | DC16-2 | DC16-1 | DC16-0 | DD16-11 | | B |
| 229 | DD16-10 | DD16-9 | DD16-8 | DD16-7 | DD16-6 | DD16-5 | | C |
| 230 | DD16-4 | DD16-3 | DD16-2 | DD16-1 | DD16-0 | DE16-11 | | A |
| 231 | DE16-10 | DE16-9 | DE16-8 | DE16-7 | DE16-6 | DE16-5 | | B |
| 232 | DE16-4 | DE16-3 | DE16-2 | DE16-1 | DE16-0 | Sub17 | | C |
| 233 | DA17-11 | DA17-10 | DA17-9 | DA17-8 | DA17-7 | DA17-6 | | A |
| 234 | DA17-5 | DA17-4 | DA17-3 | DA17-2 | DA17-1 | DA17-0 | | B |
| 235 | DB17-11 | DB17-10 | DB17-9 | DB17-8 | DB17-7 | DB17-6 | | C |

| | A | B | C | D | E | F | G | H |
|---|---|---|---|---|---|---|---|---|
| 236 | DB17-5 | DB17-4 | DB17-3 | DB17-2 | DB17-1 | DB17-0 | | A |
| 237 | DC17-11 | DC17-10 | DC17-9 | DC17-8 | DC17-7 | DC17-6 | | B |
| 238 | DC17-5 | DC17-4 | DC17-3 | DC17-2 | DC17-1 | DC17-0 | | C |
| 239 | DD17-11 | DD17-10 | DD17-9 | DD17-8 | DD17-7 | DD17-6 | | A |
| 240 | DD17-5 | DD17-4 | DD17-3 | DD17-2 | DD17-1 | DD17-0 | | B |
| 241 | DE17-11 | DE17-10 | DE17-9 | DE17-8 | DE17-7 | DE17-6 | | C |
| 242 | DE17-5 | DE17-4 | DE17-3 | DE17-2 | DE17-1 | DE17-0 | | A |
| 243 | Rs0-5 | Rs0-4 | Rs0-3 | Rs0-2 | Rs0-1 | Rs0-0 | | B |
| 244 | Rs1-5 | Rs1-4 | Rs1-3 | Rs1-2 | Rs1-1 | Rs1-0 | | C |
| 245 | Rs2-5 | Rs2-4 | Rs2-3 | Rs2-2 | Rs2-1 | Rs2-0 | | A |
| 246 | Rs3-5 | Rs3-4 | Rs3-3 | Rs3-2 | Rs3-1 | Rs3-0 | | B |
| 247 | Rs4-5 | Rs4-4 | Rs4-3 | Rs4-2 | Rs4-1 | Rs4-0 | | C |
| 248 | Rs5-5 | Rs5-4 | Rs5-3 | Rs5-2 | Rs5-1 | Rs5-0 | | A |
| 249 | Rs6-5 | Rs6-4 | Rs6-3 | Rs6-2 | Rs6-1 | Rs6-0 | | B |
| 250 | Rs7-5 | Rs7-4 | Rs7-3 | Rs7-2 | Rs7-1 | Rs7-0 | | C |
| 251 | Rs8-5 | Rs8-4 | Rs8-3 | Rs8-2 | Rs8-1 | Rs8-0 | | A |
| 252 | Rs9-5 | Rs9-4 | Rs9-3 | Rs9-2 | Rs9-1 | Rs9-0 | | B |
| 253 | Rs10-5 | Rs10-4 | Rs10-3 | Rs10-2 | Rs10-1 | Rs10-0 | | C |
| 254 | Rs11-5 | Rs11-4 | Rs11-3 | Rs11-2 | Rs11-1 | Rs11-0 | | A |
| 255 | Rs12-5 | Rs12-4 | Rs12-3 | Rs12-2 | Rs12-1 | Rs12-0 | | B |
| 256 | Rs13-5 | Rs13-4 | Rs13-3 | Rs13-2 | Rs13-1 | Rs13-0 | | C |

Fig. 7a

| | A | B | C | D | E | F | G | H |
|---|---|---|---|---|---|---|---|---|
| 257 | Sy-5(0) | Sy-4(0) | Sy-3(0) | Sy-2(1) | Sy-1(1) | Sy-0(1) | | Sync(4) |
| 258 | Cf-A(0) | Rf(0) | Sub18 | DA18-11 | DA18-10 | DA18-9 | | A |
| 259 | Cf-B(0) | DA18-8 | DA18-7 | DA18-6 | DA18-5 | DA18-4 | | B |
| 260 | Cf-C(0) | DA18-3 | DA18-2 | DA18-1 | DA18-0 | DB18-11 | | C |
| 261 | DB18-10 | DB18-9 | DB18-8 | DB18-7 | DB18-6 | DB18-5 | | A |
| 262 | DB18-4 | DB18-3 | DB18-2 | DB18-1 | DB18-0 | DC18-11 | | B |
| 263 | DC18-10 | DC18-9 | DC18-8 | DC18-7 | DC18-6 | DC18-5 | | C |
| 264 | DC18-4 | DC18-3 | DC18-2 | DC18-1 | DC18-0 | DD18-11 | | A |
| 265 | DD18-10 | DD18-9 | DD18-8 | DD18-7 | DD18-6 | DD18-5 | | B |
| 266 | DD18-4 | DD18-3 | DD18-2 | DD18-1 | DD18-0 | DE18-11 | | C |
| 267 | DE18-10 | DE18-9 | DE18-8 | DE18-7 | DE18-6 | DE18-5 | | A |
| 268 | DE18-4 | DE18-3 | DE18-2 | DE18-1 | DE18-0 | Sub19 | | B |
| 269 | DA19-11 | DA19-10 | DA19-9 | DA19-8 | DA19-7 | DA19-6 | | C |
| 270 | DA19-5 | DA19-4 | DA19-3 | DA19-2 | DA19-1 | DA19-0 | | A |
| 271 | DB19-11 | DB19-10 | DB19-9 | DB19-8 | DB19-7 | DB19-6 | | B |
| 272 | DB19-5 | DB19-4 | DB19-3 | DB19-2 | DB19-1 | DB19-0 | | C |
| 273 | DC19-11 | DC19-10 | DC19-9 | DC19-8 | DC19-7 | DC19-6 | | A |
| 274 | DC19-5 | DC19-4 | DC19-3 | DC19-2 | DC19-1 | DC19-0 | | B |
| 275 | DD19-11 | DD19-10 | DD19-9 | DD19-8 | DD19-7 | DD19-6 | | C |
| 276 | DD19-5 | DD19-4 | DD19-3 | DD19-2 | DD19-1 | DD19-0 | | A |
| 277 | DE19-11 | DE19-10 | DE19-9 | DE19-8 | DE19-7 | DE19-6 | | B |

Fig. 76

| | A | B | C | D | E | F | G | H |
|---|---|---|---|---|---|---|---|---|
| 278 | DE19-5 | DE19-4 | DE19-3 | DE19-2 | DE19-1 | DE19-0 | | C |
| 279 | Sub20 | | | | | | | A |
| 280 | DA20-6 | DA20-5 | DA20-4 | DA20-3 | DA20-2 | DA20-1 | | B |
| 281 | DA20-0 | DA20-11 | DA20-10 | DA20-9 | DA20-8 | DA20-7 | | C |
| 282 | DB20-6 | DB20-5 | DB20-4 | DB20-3 | DB20-2 | DB20-1 | | A |
| 283 | DB20-0 | DB20-11 | DB20-10 | DB20-9 | DB20-8 | DB20-7 | | B |
| 284 | DC20-6 | DC20-5 | DC20-4 | DC20-3 | DC20-2 | DC20-1 | | C |
| 285 | DC20-0 | DC20-11 | DC20-10 | DC20-9 | DC20-8 | DC20-7 | | A |
| 286 | DD20-6 | DD20-5 | DD20-4 | DD20-3 | DD20-2 | DD20-1 | | B |
| 287 | DD20-0 | DD20-11 | DD20-10 | DD20-9 | DD20-8 | DD20-7 | | C |
| 288 | DE20-6 | DE20-5 | DE20-4 | DE20-3 | DE20-2 | DE20-1 | | A |
| 289 | DE20-0 | Sub21 | | | | | | B |
| 290 | DA21-7 | DA21-6 | DA21-11 | DA21-10 | DA21-9 | DA21-8 | | C |
| 291 | DA21-1 | DA21-0 | DA21-5 | DA21-4 | DA21-3 | DA21-2 | | A |
| 292 | DB21-7 | DB21-6 | DB21-11 | DB21-10 | DB21-9 | DB21-8 | | B |
| 293 | DB21-1 | DB21-0 | DB21-5 | DB21-4 | DB21-3 | DB21-2 | | C |
| 294 | DC21-7 | DC21-6 | DC21-11 | DC21-10 | DC21-9 | DC21-8 | | A |
| 295 | DC21-1 | DC21-0 | DC21-5 | DC21-4 | DC21-3 | DC21-2 | | B |
| 296 | DD21-7 | DD21-6 | DD21-11 | DD21-10 | DD21-9 | DD21-8 | | C |
| 297 | DD21-1 | DD21-0 | DD21-5 | DD21-4 | DD21-3 | DD21-2 | | A |
| 298 | DE21-7 | DE21-6 | DE21-11 | DE21-10 | DE21-9 | DE21-8 | | B |
| 299 | DE21-1 | DE21-0 | Sub22 | DA22-11 | DA22-10 | DA22-9 | | C |

Fig. 7C

|   | A | B | C | D | E | F | G | H |
|---|---|---|---|---|---|---|---|---|
| 300 | DA22-8 | DA22-7 | DA22-6 | DA22-5 | DA22-4 | DA22-3 | | A |
| 301 | DA22-2 | DA22-1 | DA22-0 | DB22-11 | DB22-10 | DB22-9 | | B |
| 302 | DB22-8 | DB22-7 | DB22-6 | DB22-5 | DB22-4 | DB22-3 | | C |
| 303 | DB22-2 | DB22-1 | DB22-0 | DC22-11 | DC22-10 | DC22-9 | | A |
| 304 | DC22-8 | DC22-7 | DC22-6 | DC22-5 | DC22-4 | DC22-3 | | B |
| 305 | DC22-2 | DC22-1 | DC22-0 | DD22-11 | DD22-10 | DD22-9 | | C |
| 306 | DD22-8 | DD22-7 | DD22-6 | DD22-5 | DD22-4 | DD22-3 | | A |
| 307 | Rs0-5 | Rs0-4 | Rs0-3 | Rs0-2 | Rs0-1 | Rs0-0 | | B |
| 308 | Rs1-5 | Rs1-4 | Rs1-3 | Rs1-2 | Rs1-1 | Rs1-0 | | C |
| 309 | Rs2-5 | Rs2-4 | Rs2-3 | Rs2-2 | Rs2-1 | Rs2-0 | | A |
| 310 | Rs3-5 | Rs3-4 | Rs3-3 | Rs3-2 | Rs3-1 | Rs3-0 | | B |
| 311 | Rs4-5 | Rs4-4 | Rs4-3 | Rs4-2 | Rs4-1 | Rs4-0 | | C |
| 312 | Rs5-5 | Rs5-4 | Rs5-3 | Rs5-2 | Rs5-1 | Rs5-0 | | A |
| 313 | Rs6-5 | Rs6-4 | Rs6-3 | Rs6-2 | Rs6-1 | Rs6-0 | | B |
| 314 | Rs7-5 | Rs7-4 | Rs7-3 | Rs7-2 | Rs7-1 | Rs7-0 | | C |
| 315 | Rs8-5 | Rs8-4 | Rs8-3 | Rs8-2 | Rs8-1 | Rs8-0 | | A |
| 316 | Rs9-5 | Rs9-4 | Rs9-3 | Rs9-2 | Rs9-1 | Rs9-0 | | B |
| 317 | Rs10-5 | Rs10-4 | Rs10-3 | Rs10-2 | Rs10-1 | Rs10-0 | | C |
| 318 | Rs11-5 | Rs11-4 | Rs11-3 | Rs11-2 | Rs11-1 | Rs11-0 | | A |
| 319 | Rs12-5 | Rs12-4 | Rs12-3 | Rs12-2 | Rs12-1 | Rs12-0 | | B |
| 320 | Rs13-5 | Rs13-4 | Rs13-3 | Rs13-2 | Rs13-1 | Rs13-0 | | C |

| | A | B | C | D | E | F | G | H |
|---|---|---|---|---|---|---|---|---|
| 321 | Sy-5(0) | Sy-4(0) | Sy-3(0) | Sy-2(1) | Sy-1(1) | Sy-0(1) | | Sync(5) |
| 322 | Cf-A(0) | Rf(0) | DD22-2 | DD22-1 | DD22-0 | DE22-11 | | A |
| 323 | Cf-B(0) | DE22-10 | DE22-9 | DE22-8 | DE22-7 | DE22-6 | | B |
| 324 | Cf-C(0) | DE22-5 | DE22-4 | DE22-3 | DE22-2 | DE22-1 | | C |
| 325 | DE22-0 | Sub23 | DA23-11 | DA23-10 | DA23-9 | DA23-8 | | A |
| 326 | DA23-7 | DA23-6 | DA23-5 | DA23-4 | DA23-3 | DA23-2 | | B |
| 327 | DA23-1 | DA23-0 | DB23-11 | DB23-10 | DB23-9 | DB23-8 | | C |
| 328 | DB23-7 | DB23-6 | DB23-5 | DB23-4 | DB23-3 | DB23-2 | | A |
| 329 | DB23-1 | DB23-0 | DC23-11 | DC23-10 | DC23-9 | DC23-8 | | B |
| 330 | DC23-7 | DC23-6 | DC23-5 | DC23-4 | DC23-3 | DC23-2 | | C |
| 331 | DC23-1 | DC23-0 | DD23-11 | DD23-10 | DD23-9 | DD23-8 | | A |
| 332 | DD23-7 | DD23-6 | DD23-5 | DD23-4 | DD23-3 | DD23-2 | | B |
| 333 | DD23-1 | DD23-0 | DE23-11 | DE23-10 | DE23-9 | DE23-8 | | C |
| 334 | DE23-7 | DE23-6 | DE23-5 | DE23-4 | DE23-3 | DE23-2 | | A |
| 335 | DE23-1 | DE23-0 | Sub24 | DA24-11 | DA24-10 | DA24-9 | | B |
| 336 | DA24-8 | DA24-7 | DA24-6 | DA24-5 | DA24-4 | DA24-3 | | C |
| 337 | DA24-2 | DA24-1 | DA24-0 | DB24-11 | DB24-10 | DB24-9 | | A |
| 338 | DB24-8 | DB24-7 | DB24-6 | DB24-5 | DB24-4 | DB24-3 | | B |
| 339 | DB24-2 | DB24-1 | DB24-0 | DC24-11 | DC24-10 | DC24-9 | | C |
| 340 | DC24-8 | DC24-7 | DC24-6 | DC24-5 | DC24-4 | DC24-3 | | A |
| 341 | DC24-2 | DC24-1 | DC24-0 | DD24-11 | DD24-10 | DD24-9 | | B |

| | A | B | C | D | E | F | G | H |
|---|---|---|---|---|---|---|---|---|
| 342 | DD24-8 | DD24-7 | DD24-6 | DD24-5 | DD24-4 | DD24-3 | | C |
| 343 | DD24-2 | DD24-1 | DD24-0 | DE24-11 | DE24-10 | DE24-9 | | A |
| 344 | DE24-8 | DE24-7 | DE24-6 | DE24-5 | DE24-4 | DE24-3 | | B |
| 345 | DE24-2 | DE24-1 | DE24-0 | Sub25 | DA25-11 | DA25-10 | | C |
| 346 | DA25-9 | DA25-8 | DA25-7 | DA25-6 | DA25-5 | DA25-4 | | A |
| 347 | DA25-3 | DA25-2 | DA25-1 | DA25-0 | DB25-11 | DB25-10 | | B |
| 348 | DB25-9 | DB25-8 | DB25-7 | DB25-6 | DB25-5 | DB25-4 | | C |
| 349 | DB25-3 | DB25-2 | DB25-1 | DB25-0 | DC25-11 | DC25-10 | | A |
| 350 | DC25-9 | DC25-8 | DC25-7 | DC25-6 | DC25-5 | DC25-4 | | B |
| 351 | DC25-3 | DC25-2 | DC25-1 | DC25-0 | DD25-11 | DD25-10 | | C |
| 352 | DD25-9 | DD25-8 | DD25-7 | DD25-6 | DD25-5 | DD25-4 | | A |
| 353 | DD25-3 | DD25-2 | DD25-1 | DD25-0 | DE25-11 | DE25-10 | | B |
| 354 | DE25-9 | DE25-8 | DE25-7 | DE25-6 | DE25-5 | DE25-4 | | C |
| 355 | DE25-3 | DE25-2 | DE25-1 | DE25-0 | Sub26 | DA26-11 | | A |
| 356 | DA26-10 | DA26-9 | DA26-8 | DA26-7 | DA26-6 | DA26-5 | | B |
| 357 | DA26-4 | DA26-3 | DA26-2 | DA26-1 | DA26-0 | DB26-11 | | C |
| 358 | DB26-10 | DB26-9 | DB26-8 | DB26-7 | DB26-6 | DB26-5 | | A |
| 359 | DB26-4 | DB26-3 | DB26-2 | DB26-1 | DB26-0 | DC26-11 | | B |
| 360 | DC26-10 | DC26-9 | DC26-8 | DC26-7 | DC26-6 | DC26-5 | | C |
| 361 | DC26-4 | DC26-3 | DC26-2 | DC26-1 | DC26-0 | DD26-11 | | A |
| 362 | DD26-10 | DD26-9 | DD26-8 | DD26-7 | DD26-6 | DD26-5 | | B |
| 363 | DD26-4 | DD26-3 | DD26-2 | DD26-1 | DD26-0 | DE26-11 | | C |

Fig. 8c

| | A | B | C | D | E | F | G | H |
|---|---|---|---|---|---|---|---|---|
| 364 | DE26-10 | DE26-9 | DE26-8 | DE26-7 | DE26-6 | DE26-5 | | A |
| 365 | DE26-4 | DE26-3 | DE26-2 | DE26-1 | DE26-0 | Sub27 | | B |
| 366 | DA27-11 | DA27-10 | DA27-9 | DA27-8 | DA27-7 | DA27-6 | | C |
| 367 | DA27-5 | DA27-4 | DA27-3 | DA27-2 | DA27-1 | DA27-0 | | A |
| 368 | DB27-11 | DB27-10 | DB27-9 | DB27-8 | DB27-7 | DB27-6 | | B |
| 369 | DB27-5 | DB27-4 | DB27-3 | DB27-2 | DB27-1 | DB27-0 | | C |
| 370 | DC27-11 | DC27-10 | DC27-9 | DC27-8 | DC27-7 | DC27-6 | | A |
| 371 | Rs0-5 | Rs0-4 | Rs0-3 | Rs0-2 | Rs0-1 | Rs0-0 | | B |
| 372 | Rs1-5 | Rs1-4 | Rs1-3 | Rs1-2 | Rs1-1 | Rs1-0 | | C |
| 373 | Rs2-5 | Rs2-4 | Rs2-3 | Rs2-2 | Rs2-1 | Rs2-0 | | A |
| 374 | Rs3-5 | Rs3-4 | Rs3-3 | Rs3-2 | Rs3-1 | Rs3-0 | | B |
| 375 | Rs4-5 | Rs4-4 | Rs4-3 | Rs4-2 | Rs4-1 | Rs4-0 | | C |
| 376 | Rs5-5 | Rs5-4 | Rs5-3 | Rs5-2 | Rs5-1 | Rs5-0 | | A |
| 377 | Rs6-5 | Rs6-4 | Rs6-3 | Rs6-2 | Rs6-1 | Rs6-0 | | B |
| 378 | Rs7-5 | Rs7-4 | Rs7-3 | Rs7-2 | Rs7-1 | Rs7-0 | | C |
| 379 | Rs8-5 | Rs8-4 | Rs8-3 | Rs8-2 | Rs8-1 | Rs8-0 | | A |
| 380 | Rs9-5 | Rs9-4 | Rs9-3 | Rs9-2 | Rs9-1 | Rs9-0 | | B |
| 381 | Rs10-5 | Rs10-4 | Rs10-3 | Rs10-2 | Rs10-1 | Rs10-0 | | C |
| 382 | Rs11-5 | Rs11-4 | Rs11-3 | Rs11-2 | Rs11-1 | Rs11-0 | | A |
| 383 | Rs12-5 | Rs12-4 | Rs12-3 | Rs12-2 | Rs12-1 | Rs12-0 | | B |
| 384 | Rs13-5 | Rs13-4 | Rs13-3 | Rs13-2 | Rs13-1 | Rs13-0 | | C |

Fig. 9a

| | A | B | C | D | E | F | G | H |
|---|---|---|---|---|---|---|---|---|
| 385 | Sy-5(0) | Sy-4(0) | Sy-3(0) | Sy-2(1) | Sy-1(1) | Sy-0(1) | | Sync(6) |
| 386 | Cf-A(0) | Rf(0) | DC27-5 | DC27-4 | DC27-3 | DC27-2 | | A |
| 387 | Cf-B(0) | DC27-1 | DC27-0 | DD27-11 | DD27-10 | DD27-9 | | B |
| 388 | Cf-C(0) | DD27-8 | DD27-7 | DD27-6 | DD27-5 | DD27-4 | | C |
| 389 | DD27-3 | DD27-2 | DD27-1 | DD27-0 | DE27-11 | DE27-10 | | A |
| 390 | DE27-9 | DE27-8 | DE27-7 | DE27-6 | DE27-5 | DE27-4 | | B |
| 391 | DE27-3 | DE27-2 | DE27-1 | DE27-0 | Sub28 | DA28-11 | | C |
| 392 | DA28-10 | DA28-9 | DA28-8 | DA28-7 | DA28-6 | DA28-5 | | A |
| 393 | DA28-4 | DA28-3 | DA28-2 | DA28-1 | DA28-0 | DB28-11 | | B |
| 394 | DB28-10 | DB28-9 | DB28-8 | DB28-7 | DB28-6 | DB28-5 | | C |
| 395 | DB28-4 | DB28-3 | DB28-2 | DB28-1 | DB28-0 | DC28-11 | | A |
| 396 | DC28-10 | DC28-9 | DC28-8 | DC28-7 | DC28-6 | DC28-5 | | B |
| 397 | DC28-4 | DC28-3 | DC28-2 | DC28-1 | DC28-0 | DD28-11 | | C |
| 398 | DD28-10 | DD28-9 | DD28-8 | DD28-7 | DD28-6 | DD28-5 | | A |
| 399 | DD28-4 | DD28-3 | DD28-2 | DD28-1 | DD28-0 | DE28-11 | | B |
| 400 | DE28-10 | DE28-9 | DE28-8 | DE28-7 | DE28-6 | DE28-5 | | C |
| 401 | DE28-4 | DE28-3 | DE28-2 | DE28-1 | DE28-0 | Sub29 | | A |
| 402 | DA29-11 | DA29-10 | DA29-9 | DA29-8 | DA29-7 | DA29-6 | | B |
| 403 | DA29-5 | DA29-4 | DA29-3 | DA29-2 | DA29-1 | DA29-0 | | C |
| 404 | DB29-11 | DB29-10 | DB29-9 | DB29-8 | DB29-7 | DB29-6 | | A |
| 405 | DB29-5 | DB29-4 | DB29-3 | DB29-2 | DB29-1 | DB29-0 | | B |

| | A | B | C | D | E | F | G | H |
|---|---|---|---|---|---|---|---|---|
| 406 | DC29-11 | DC29-10 | DC29-9 | DC29-8 | DC29-7 | DC29-6 | | C |
| 407 | DC29-5 | DC29-4 | DC29-3 | DC29-2 | DC29-1 | DC29-0 | | A |
| 408 | DD29-11 | DD29-10 | DD29-9 | DD29-8 | DD29-7 | DD29-6 | | B |
| 409 | DD29-5 | DD29-4 | DD29-3 | DD29-2 | DD29-1 | DD29-0 | | C |
| 410 | DE29-11 | DE29-10 | DE29-9 | DE29-8 | DE29-7 | DE29-6 | | A |
| 411 | DE29-5 | DE29-4 | DE29-3 | DE29-2 | DE29-1 | DE29-0 | | B |
| 412 | Sub30 | DA30-11 | DA30-10 | DA30-9 | DA30-8 | DA30-7 | | C |
| 413 | DA30-6 | DA30-5 | DA30-4 | DA30-3 | DA30-2 | DA30-1 | | A |
| 414 | DA30-0 | DB30-11 | DB30-10 | DB30-9 | DB30-8 | DB30-7 | | B |
| 415 | DB30-6 | DB30-5 | DB30-4 | DB30-3 | DB30-2 | DB30-1 | | C |
| 416 | DB30-0 | DC30-11 | DC30-10 | DC30-9 | DC30-8 | DC30-7 | | A |
| 417 | DC30-6 | DC30-5 | DC30-4 | DC30-3 | DC30-2 | DC30-1 | | B |
| 418 | DC30-0 | DD30-11 | DD30-10 | DD30-9 | DD30-8 | DD30-7 | | C |
| 419 | DD30-6 | DD30-5 | DD30-4 | DD30-3 | DD30-2 | DD30-1 | | A |
| 420 | DD30-0 | DE30-11 | DE30-10 | DE30-9 | DE30-8 | DE30-7 | | B |
| 421 | DE30-6 | DE30-5 | DE30-4 | DE30-3 | DE30-2 | DE30-1 | | C |
| 422 | DE30-0 | Sub31 | DA31-11 | DA31-10 | DA31-9 | DA31-8 | | A |
| 423 | DA31-7 | DA31-6 | DA31-5 | DA31-4 | DA31-3 | DA31-2 | | B |
| 424 | DA31-1 | DA31-0 | DB31-11 | DB31-10 | DB31-9 | DB31-8 | | C |
| 425 | DB31-7 | DB31-6 | DB31-5 | DB31-4 | DB31-3 | DB31-2 | | A |
| 426 | DB31-1 | DB31-0 | DC31-11 | DC31-10 | DC31-9 | DC31-8 | | B |
| 427 | DC31-7 | DC31-6 | DC31-5 | DC31-4 | DC31-3 | DC31-2 | | C |

Fig. 9b

| | A | B | C | D | E | F | G | H |
|---|---|---|---|---|---|---|---|---|
| 428 | DC31-1 | DC31-0 | DD31-11 | DD31-10 | DD31-9 | DD31-8 | | |
| 429 | DD31-7 | DD31-6 | DD31-5 | DD31-4 | DD31-3 | DD31-2 | | A |
| 430 | DD31-1 | DD31-0 | DE31-11 | DE31-10 | DE31-9 | DE31-8 | | B |
| 431 | DE31-7 | DE31-6 | DE31-5 | DE31-4 | DE31-3 | DE31-2 | | C |
| 432 | DE31-1 | DE31-0 | Crc-15 | Crc-14 | Crc-13 | Crc-12 | | A |
| 433 | Crc-11 | Crc-10 | Crc-9 | Crc-8 | Crc-7 | Crc-6 | | B |
| 434 | Crc-5 | Crc-4 | Crc-3 | Crc-2 | Crc-1 | Crc-0 | | C |
| 435 | Rs0-5 | Rs0-4 | Rs0-3 | Rs0-2 | Rs0-1 | Rs0-0 | | A |
| 436 | Rs1-5 | Rs1-4 | Rs1-3 | Rs1-2 | Rs1-1 | Rs1-0 | | B |
| 437 | Rs2-5 | Rs2-4 | Rs2-3 | Rs2-2 | Rs2-1 | Rs2-0 | | C |
| 438 | Rs3-5 | Rs3-4 | Rs3-3 | Rs3-2 | Rs3-1 | Rs3-0 | | A |
| 439 | Rs4-5 | Rs4-4 | Rs4-3 | Rs4-2 | Rs4-1 | Rs4-0 | | B |
| 440 | Rs5-5 | Rs5-4 | Rs5-3 | Rs5-2 | Rs5-1 | Rs5-0 | | C |
| 441 | Rs6-5 | Rs6-4 | Rs6-3 | Rs6-2 | Rs6-1 | Rs6-0 | | A |
| 442 | Rs7-5 | Rs7-4 | Rs7-3 | Rs7-2 | Rs7-1 | Rs7-0 | | B |
| 443 | Rs8-5 | Rs8-4 | Rs8-3 | Rs8-2 | Rs8-1 | Rs8-0 | | C |
| 444 | Rs9-5 | Rs9-4 | Rs9-3 | Rs9-2 | Rs9-1 | Rs9-0 | | A |
| 445 | Rs10-5 | Rs10-4 | Rs10-3 | Rs10-2 | Rs10-1 | Rs10-0 | | B |
| 446 | Rs11-5 | Rs11-4 | Rs11-3 | Rs11-2 | Rs11-1 | Rs11-0 | | C |
| 447 | Rs12-5 | Rs12-4 | Rs12-3 | Rs12-2 | Rs12-1 | Rs12-0 | | A |
| 448 | Rs13-5 | Rs13-4 | Rs13-3 | Rs13-2 | Rs13-1 | Rs13-0 | | B |

| 6-BIT SYMBOL | 8-BIT SYMBOL | 6-BIT SYMBOL | 8-BIT SYMBOL |
|---|---|---|---|
| 000000 | 00010111 | 100000 | 10001011 |
| 000001 | 00011011 | 100001 | 10001101 |
| 000010 | 00011101 | 100010 | 10001110 |
| 000011 | 00100111 | 100011 | 10010011 |
| 000100 | 00101011 | 100100 | 10010101 |
| 000101 | 00101101 | 100101 | 10010110 |
| 000110 | 00101110 | 100110 | 10011001 |
| 000111 | 00110011 | 100111 | 10011010 |
| 001000 | 00110101 | 101000 | 10011100 |
| 001001 | 00110110 | 101001 | 10100011 |
| 001010 | 00111001 | 101010 | 10100101 |
| 001011 | 00111010 | 101011 | 10100110 |
| 001100 | 00111100 | 101100 | 10101001 |
| 001101 | 01000111 | 101101 | 10101010 |
| 001110 | 01001011 | 101110 | 10101100 |
| 001111 | 01001101 | 101111 | 10110001 |
| 010000 | 01001110 | 110000 | 10110010 |
| 010001 | 01010011 | 110001 | 10110100 |
| 010010 | 01010101 | 110010 | 10111000 |
| 010011 | 01010110 | 110011 | 11000011 |
| 010100 | 01011001 | 110100 | 11000101 |
| 010101 | 01011010 | 110101 | 11000110 |
| 010110 | 01011100 | 110110 | 11001001 |
| 010111 | 01100011 | 110111 | 11001010 |
| 011000 | 01100101 | 111000 | 11001100 |
| 011001 | 01100110 | 111001 | 11010001 |
| 011010 | 01101001 | 111010 | 11010010 |
| 011011 | 01101010 | 111011 | 11010100 |
| 011100 | 01101100 | 111100 | 11011000 |
| 011101 | 01110001 | 111101 | 11100010 |
| 011110 | 01110010 | 111110 | 11100100 |
| 011111 | 01110100 | 111111 | 11101000 |

Fig. 13a

TIME →

| IN_CNT (32) | OUT_CNT (39) | OUT_MOD (42) | OUT_ADDR (44) |
|---|---|---|---|
| 00 | 00 | XX | XX |
| 01 | 00 | XX | XX |
| 02 | 00 | XX | XX |
| 03 | 00 | XX | XX |
| 04 | 00 | XX | XX |
| 05 | 00 | XX | XX |
| 06 | 00 | XX | XX |
| 07 | 00 | XX | XX |
| 08 | 00 | XX | XX |
| REF_CNT--> 09 | 00 | 10 | 19 |
| 0A | 01 | 12 | 1B |
| 0B | 02 | 14 | 1D |
| 0C | 03 | 16 | 1F |
| 0D | 04 | 18 | 01 |
| 0E | 05 | 1A | 03 |
| 0F | 06 | 1C | 05 |
| 10 | 07 | 1E | 07 |
| 11 | 08 | 11 | 1A |
| 12 | 09 | 13 | 1C |
| 13 | 0A | 15 | 1E |
| 14 | 0B | 17 | 00 |
| 15 | 0C | 19 | 02 |
| 16 | 0D | 1B | 04 |
| 17 | 0E | 1D | 06 |
| 18 | 0F | 1F | 08 |

*Fig. 13b*

| 32) IN_CNT | 39) OUT_CNT | 42) OUT_MOD | 44) OUT_ADDR |
|---|---|---|---|
| 19 | 10 | 00 | 09 |
| 1A | 11 | 02 | 0B |
| 1B | 12 | 04 | 0D |
| 1C | 13 | 06 | 0F |
| 1D | 14 | 08 | 11 |
| 1E | 15 | 0A | 13 |
| 1F | 16 | 0C | 15 |
| 00 | 17 | 0E | 17 |
| 01 | 18 | 01 | 0A |
| 02 | 19 | 03 | 0C |
| 03 | 1A | 05 | 0E |
| 04 | 1B | 07 | 10 |
| 05 | 1C | 09 | 12 |
| 06 | 1D | 0B | 14 |
| 07 | 1E | 0D | 16 |
| 08 | 1F | 0F | 18 |
| 09 | 00 | 10 | 19 |
| 0A | 01 | 12 | 1B |
| 0B | 02 | 14 | 1D |
| 0C | 03 | 16 | 1F |
| 0D | 04 | 18 | 01 |
| 0E | 05 | 1A | 03 |
| 0F | 06 | 1C | 05 |
| 10 | 07 | 1E | 07 |
| 11 | 08 | 11 | 1A |
| 12 | 09 | 13 | 1C |

TIME →

DIGITAL AUDIO RECORDING FORMAT FOR MOTION PICTURE FILM

FIELD OF THE INVENTION

The present invention relates generally to a digital audio recording format for motion picture film, and more specifically, to a data format for capturing digital data representing multiple audio signal channels on motion picture film.

BACKGROUND OF THE INVENTION

Sound for motion picture films has traditionally been recorded on the film in an analog fashion. That is, a sound track, having a variable width which corresponds to the amplitude of the sound, runs the length of the film between the image frames and the sprocket holes. Compared to current audio reproduction standards, the quality of motion picture sound reproduced in this manner is relatively poor (its quality being slightly better than that produced by AM radio).

With the advent of digital sound reproduction using compact discs and digital audio tape, it has been desirable to obtain the equivalent high quality sound reproduction in movie theaters. One persistent roadblock to achieving this goal has been the inability to efficiently pack enough digital data into the space available on a motion picture film to faithfully reproduce multiple audio channels.

In the making of a motion picture film having a digital sound track, once the audio signals are digitized, they are encoded and formatted and are optically applied to the motion picture film During playback of the film in a movie theater, the digital data in the sound track is optically sensed and is decoded to reproduce the original audio signals accurately. In order to faithfully reproduce the original audio input attention must be given to the quantization level and sampling rate of the digitizer and the number of redundant data bits that are added to the sound track for error detection and correction.

In modern movie theaters, it has become a standard practice to implement more than just a two channel audio system. For example, in addition to the standard left and right channels, a center channel is output through a speaker behind the movie screen, two or more surround channels are output at various areas in the theater to create the illusion of motion, and a specialized "subwoofer" channel is used to recreate very low audible and inaudible frequencies. Thus, a minimum of six audio channels, five of them having a full audible bandwidth, must be digitally recreated. The problem is intensified by the limited space available for the data on motion picture film and the physical limitations of the film resolution which affects the minimum size of each digital bit represented on the film. Further, in order to faithfully reproduce sound in a digital system, error correction must be utilized, thus adding more data to the already limited sound track area

SUMMARY OF THE INVENTION

The present invention provides a data format for encoding audio and information digital data for use on motion picture film having a succession of image frames spaced along the length of the film The format accommodates the reproduction of multiple audio signals in coordination with visual images recorded on the film In accordance with the present invention, a digitally-sound-encoded filmstrip has digital data recorded thereon which is representative of a particular data format. The data format has a plurality of data symbol positions within each of a plurality of data fields. Each data symbol has a plurality of bit positions. The data symbol positions in each data field are filled with data representing sound values and other digital information. Each data field has redundant data to enable the detection and correction of data in the data field upon decoding of the formatted data. The data format also features a plurality of data blocks wherein each data block is made up of a group of data fields. Each data block has at least one data field that contains data redundant to the entire data block to enable the detection of errors made in correction of errors in the individual data fields.

Another feature of the present invention is that in each of a series of sound samples representative of the values of sound in sound channels at successive sampling times, the samples are recorded in a sound track wherein the successive samples are recorded in mutually remote locations of the soundtrack, thus producing interleaved sound data along the sound track.

The interleave is accomplished by periodically storing consecutive sound samples in a serial stream of samples in consecutive memory locations of a memory device. The stored sound samples are then accessed, in the required interleaved order, from the memory device.

BRIEF DESCRIPTION OF THE DRAWINGS

These and other features and advantages of the present invention will be better understood by reference to the following detailed description when considered in connection with the accompanying drawings wherein:

FIG. 2 illustrates the relationship between the digital data in the sound track and the image frames on the motion picture film.

FIG. 3a through c are tables illustrating the packing configuration of digital data for the first RS block in a superblock;

FIGS. 4 through 9 each consisting of a through c are tables respectively illustrating the packing configuration of digital data for the second through seventh RS block in a superblock;

FIG. 10 is a table illustrating the relationship between the six-data symbol RS blocks and the eight-data symbol RS blocks;

FIG. 13a and b are tables illustrating the operation of the apparatus shown in FIG. 12.

DETAILED DESCRIPTION

Figure 1:
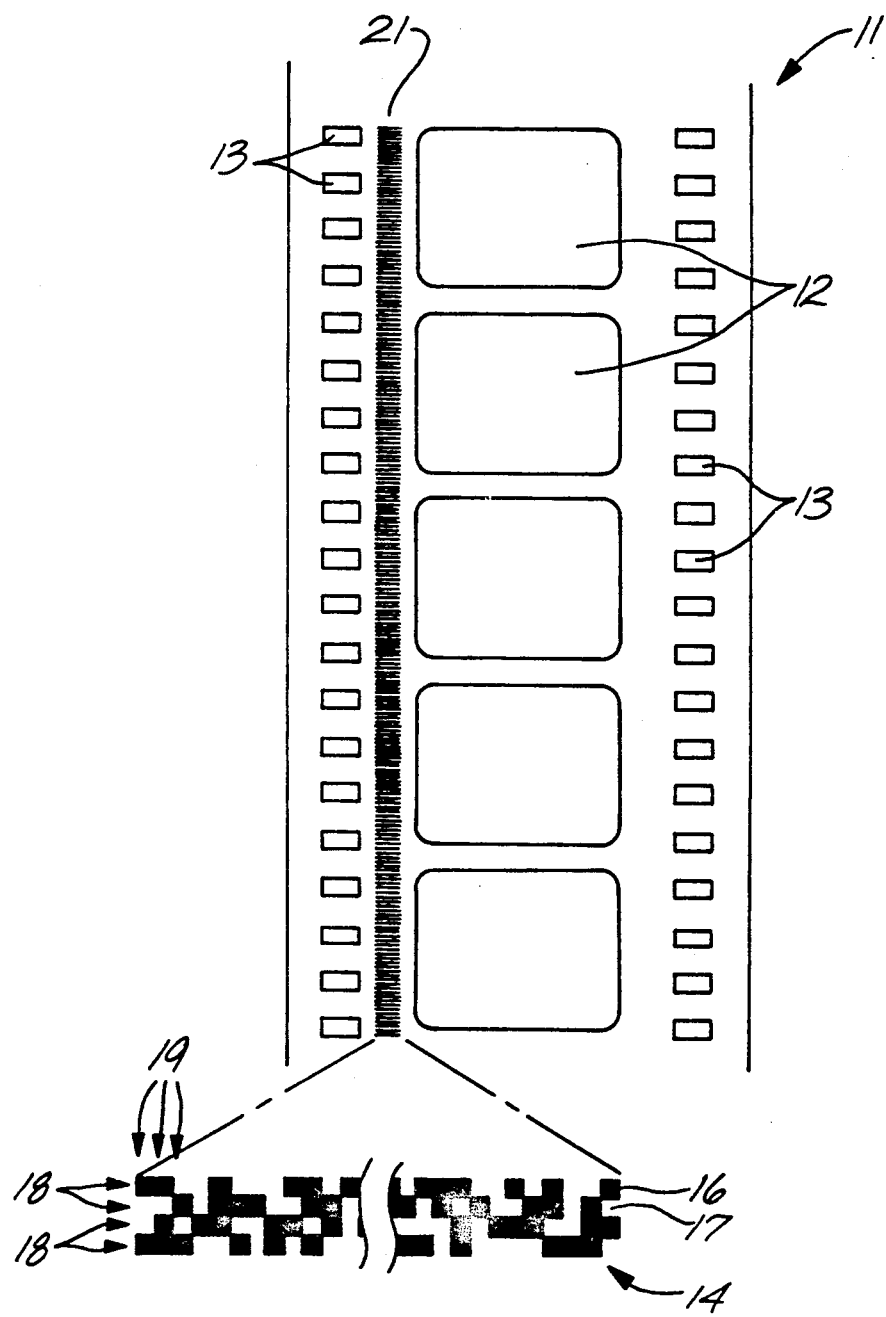
FIG. 1 illustrates a representative section of motion picture film having a digital sound track.

Referring to FIG. 1., digital data is represented on motion picture film 11, having a series of photographic images 12 and sprocket holes 13, using a pattern of digital images. More specifically, digital values are recorded in a sound track 21 comprising a series of film spots 14 where a black (or opaque) film spot 16 represents one digital value, and a white (or clear) film spot 17 represents a second digital value. In an exemplary embodiment of the present invention an opaque film spot represents a value of "one" and a clear film spot represents a value of "zero". The film spots are organized on the motion picture film into rows 18 and columns 19 which create the digital sound track 21.

The digital data in the sound track 21 represents the "sound" that is associated with the visual images on the motion picture film. The present invention can be used in conjunction with either 35 mm or 70 mm motion picture film. The representation shown in FIG. 1 is merely illustrative of the relationship of the sound track to the motion picture film.

The digital sound track 21 is located between the image frames 12 and the sprocket holes 13, and may be located either to the left or right of the image frames 12. In an exemplary embodiment, the digital sound track has a width of approximately 0.1 inches. The maximum film spot dimension is affected by, among other things, the number of audio channels to be encoded on the film strip and the desired quality of the reproduced audio channels. In an exemplary embodiment, each film spot has dimensions of approximately 14×14 microns.

All of the digital data on the sound track is organized into Reed-Solomon (RS) blocks 22 and superblocks 23. In the final formatted configuration of data on the sound track 21, there are 512 bits per each RS block 22 and seven RS blocks per superblock 23. However, as will be fully understood upon reading the entire specification, the final formatted configuration of 512 bits per RS block is arrived at after encoding of the original packing format. Since this encoding disguises the recognition of the character of each type of data packed in the RS blocks and superblocks, the format is most easily understood by referring to the contents of the RS blocks prior to encoding of said blocks (This format is shown in FIGS. 3 through 9 in detail wherein each RS block contains 384 bits of data).

In an exemplary embodiment of the present invention the superblocks are applied to the sound track end-to-end, approximately 57 superblocks fitting in the space on the sound track directly adjacent to each image frame 12. Data is contiguous down the entire length of the sound track. That is, there are no spaces in the sound track between successive superblocks.

In such an embodiment, six audio channels (Channels A through F) are ultimately recorded as audio samples on the film strip. Channels A through E are full bandwidth channels having a bandwidth spanning the range of human hearing, approximately 20 Hz to 20 Khz. Channel F, is a sub-woofer channel which has a limited bandwidth of 20 Hz to 100 Hz. The digital data format disclosed herein allows for each of a multiple of audio channels to be reproduced simultaneously.

DATA RECORD FORMAT

The superblock is the basic division of data, and within each superblock there are seven unique data field configurations in which data is packed into RS blocks. One RS block of each data configuration is used to make up a superblock and thus, each superblock comprises seven RS blocks, each of unique configuration. FIG. 3 through FIG. 9. show each of the unique RS block configurations, and FIG. 3 through FIG. 9, taken together, represent one superblock of data.

Generally, the RS blocks contain various types of data, including audio samples, redundant data, control data, and other miscellaneous data types. Each distinct type of data, as shown in the accompanying diagrams, are represented by a unique alpha numeric designation. (For example, Sy, Cf, Cnt, Sub, etc.). Briefly, audio samples represent digitized audio signals, the redundant data provides the capability of error detection and/or correction, the control data is used in various ways by the decoder to reconstruct the audio signals, and the miscellaneous data provides data channels for the transmission of non-audio information.

The RS block and superblock configurations provide a two-level block code where redundancy is employed at each level to support the integrity of the recorded data. At the RS block level, a Reed-Solomon code is implemented that uses polynomials to encode and decode the block data. This implementation allows for both the detection and correction of errors within the RS block. At the superblock level, a cyclic redundancy check (CRC) code is implemented that uses the remainder from a polynomial division of a portion of the data each superblock to detect for data errors in the superblock.

Referring to FIG. 3, the first RS block configuration within a superblock is shown. The RS block contains 384 bits of data divided into 6-bit data symbols. The table shown in FIG. 3. is divided into columns A through H and rows 1 through 64. The remainder of the RS block configurations shown in FIGS. 4 through 9 have the same column designations, however, the row designations continue from "64" starting with row "65" in the second RS block configuration shown in FIG. 4 and continuing up through the last row, "488" in the seventh and last RS block configuration shown in FIG. 9. The rows are labeled "1" through "448" to indicate their relative position in the superblock.

It should be understood that the row and column orientation of the RS block configurations, as shown in FIGS. 3 through 9, do not correspond to row and column structure of the data as it appears on the film strip. Nor do the column designations shown as A through H in the table bear any relationship to the designation of audio data as channels A through F. Rather, the tables are merely an instrument for showing how the data is organized in each RS block. For example, audio samples, along with redundant data and control data, are initially organized into RS blocks having 64 six-bit data symbols. In the relevant figures, these 64 6-bit data symbols are shown in columns A through F. Column G has intentionally been left blank. The entries in column H of the tables also bear no direct relationship with the labeling of columns (A through H) or the labeling of the particular audio channels (A through F). Rather, the entries found in column H associates each 6-bit data symbol in the table with a particular Complementation group, A, B or C. Each RS block is internally divided into three complementation groups. The 6-bit data symbols associated with each complementation group are evenly distributed throughout the RS block. At a point in the encoding process, it may be necessary to invert, or complement, the data in one, some, or all of the complementation groups. Each complementation group in each RS block acts independently of the remaining complementation groups in that particular RS block; however, if it is necessary to invert the data in a complementation group, each bit within the complementation group is inverted. Also, the manipulation of data in a complementation group of one RS block is independent of all other complementation groups in all of the RS blocks in the sound track. The function of this grouping will be described in greater detail below. In summary, columns G and H are included in the figures for reference only.

The data bits, as shown in FIG. 3 through FIG. 9, will be referred to by their bit positions within the RS block, the bit positions being defined by the row reference numbers "1" through "448" and column reference numbers A through F. The order of the bits is designated as follows. The first bit position is at the row/column designation A-1 and the following five bit positions follow along the first row, bit seven being at A-2. The last bit position in the first RS block is at row/column designation F-64. Accordingly, the last bit position of each superblock is at row/column designation F-448.

The first six bit positions of each RS block, (e.g., designated A-1 through F-1 in FIG. 3), are filled with Synchronization Symbol bits (Sy—<b>(<v>), where "b" is the bit number, and "v" is the value of the bit). The decimal value of the Synchronization Symbol for each RS block is "seven" (i.e. the binary representation of the six bits is "000111"). The Synchronization Symbol enables the decoding apparatus to recognize the boundaries of each RS block, thus allowing each RS block to be separated from the data stream flowing into the decoder.

The bit position labeled "Rf" contains the Record Start Flag (Rf(<v>), where "v" is the value of the bit). The Record Start Flag occupies bit position B-2 in the first RS block configuration, and its bit position relative the first bit of the RS block in each succeeding RS block configuration is identical to that of the first RS block configuration. The Record Start Flag for the first RS block of record (the first RS block within the superblock) is always set to equal "one". The Record Start Flags for the remaining six RS blocks of record are always set to equal "zero". The Record Start Flag serves two basic purposes. First, it enables the decoding circuitry to identify the beginning of each superblock. When a "one" is recognized by the decoder, the decoder knows that the RS block in which the Record Start Flag is contained is the first RS block in the superblock. Second, the Record Start Flag provides for the decoder an absolute position reference for every data bit in each RS block and superblock since the location of the Flag relative to other data in the block structure is identical for each RS block.

The bit positions designated as A-2, A-3, and A-4 in the first RS block contains the Complementation Flags for Complementation groups A, B and C respectively (Cf—<g>(<v>), where "g" is the Complementation group, and "v" is the value of the flag). Each of the other six RS block configurations have Complementation Flags located in identical relative bit positions. A value of "one" for a Complementation Flag indicates that each of the data bits associated with that particular Complementation group has been inverted during the encoding process. A value of zero indicates that the data bits associated with that Complementation group have not been inverted.

The bit position designated as C-2 in the first RS block configuration contains the Physical Frame Marker (Frame). In an exemplary embodiment, there is only one Physical Frame Marker in each superblock. In an exemplary embodiment, the Physical Frame Marker is set (equals "one") in superblocks which are physically aligned beside the first half of an image frame and reset (equals "zero") in superblocks which are physically aligned beside the last half of an image frame and in superblocks in which no valid sound data is present (such as during the leader and the trailer). In accordance with the above designation, image frames situated along the length of the film strip are conceptually divided into halves, the first half generally being the half passes any given reference point first as the motion picture film moves in a forward direction, the last half being that half of the image frame being that half which passes the same reference point immediately following the first half. This particular use of the Physical Frame Marker produces a low bandwidth clock pulse, the frequency of which coincides with the rate at which individual image frames are moving through the projection apparatus.

The bit position designated as D-2 in the first RS block configuration contains the Event Marker (Event). In an exemplary embodiment, there is only one Event Marker in each superblock. The presence of Event Marker bits in each superblock provides the user of the format with a carrier channel with which to convey information to the decoder or projection devices. In an exemplary embodiment, the Event Marker is used to indicate the occurrence of an event (i.e., to control automation equipment in a theater which may have the capability of opening and closing curtains, turning lights on and off as well as other special effects). As such, the Event Marker bits replace the use of reflective sense tape used on conventional motion picture films to indicate the occurrence of an event.

The Record Sequence Count bits (Cnt-b, where "b" is the bit number) consists of 24-bits per each superblock, all contained in the first RS block of the superblock. The Record Sequence Count bits occupy bit positions designated as E-2 through F-6, excluding bit A-3 and A-4 which contain Complementation Flags for Complementation group B and C. In an exemplary embodiment, the Record Sequence Count bits provide for the unique identification of each superblock in the entire film strip. For example, the Record Sequence Count bits represent a binary word wherein Cnt-23 is the most significant bit and Cnt-0 is the least significant bit. In the first superblock in the sound track, each of the Record Sequence Count bits are "zero" thus representing a count of zero. In the next superblock in the soundtrack, each of the Record Sequence Count bits are zero except for Cnt-0 which is a "one", thus representing a count of one. The count represented by the Record Sequence Count bits are thereafter increased by one for each successive superblock along the soundtrack until the maximum count of 16,777,215 is reached, at which point the count begins at zero and counts up once again. Using a twenty-four bit word to represent the Record Sequence Count allows for approximately 3½ hours of film to be decoded without repeating any of the sequence counts. The decoder uses the Record Sequence Count to reassemble the data read from the sound track in the correct order. (This will become more apparent upon the understanding of the interleaving scheme discussed below). The Record Sequence Count also provides for error detection. For example, if the decoder reads two successive superblocks that do not have consecutive Record Sequence Counts, then it knows that at least some data is either in error or missing, and the decoder can take corrective action.

Audio data is provided in two forms. One is the Full Sound Sample (S<c><n>—<b>, where "c" designates the audio channel, "n" is the sample number, and "b" is the bit within the audio sample). The other is the Delta Sound Sample (D<c><n>—<b>, where "c" designates the audio channel, "n" is the sample number, and "b" is the bit within the audio sample). A Full Sound Sample is a sixteen-bit word that represents the amplitude of a time sample of the sampled signal. A Delta Sound Sample is an encoded twelve-bit word that represents the amplitude difference between two consecutive sixteen-bit time samples of the sampled signal.

Each of the superblocks contains one Full Sound Sample per channel (A through F) (S<c>0) and thirty-one Delta Sound Samples for channels A through E (D<c>1 through D<c>31). Thus channels A through E each have thirty-two samples per superblock and channel F has one sample per superblock. Only one sample of channel F is required per each superblock since its bandwidth is limited to 100 Hz (i.e. less audio samples are needed to reproduce a 100 Hz audio signal than a 20 KHz audio signal). Full Sound Samples for all of the six audio channels A through F are contained in the first RS block configuration. For example, Full Sound Samples for channels A through F appear in the first RS block configuration, as shown in FIG. 3, beginning at bit position B-7 and continuing through to bit position A-23. Thirty-one Delta Sound Samples for channels A through E are distributed throughout all of the six RS block configurations as shown in FIG. 3 through FIG. 9.

Within any one of the groups of sound samples in a superblock (e.g. the one group of Full Sound Samples or any of the thirty-one groups of Delta Sound Samples), each sound sample in the group corresponds to a common moment in time (assuming that each channel is simultaneously sampled). However, an important feature of the present invention is that the successive groups of sound samples appearing in any one superblock do not necessarily contain consecutively sampled audio samples. Instead, consecutive audio samples for each channel are interleaved so that they occupy mutually remote locations along the length of the sound track. This particular feature is described at length below.

The Subcode Bitstream Number (Sub<n>) consists of 32-bits distributed throughout each superblock. For example, in the first RS block configuration in a superblock, Sub0 is located at position A-7, Sub1 is located at position B-23, Sub2 is located at position C-33 and Sub3 is located at position D-43. The remaining twenty-eight Subcode Bitstream Numbers, Sub4 through Sub31, are distributed throughout the second through seventh RS blocks. The Subcode Bitstream Number bits are positioned immediately before each Delta Sound samples and are filled with ones when not in use. The Subcode Bitstream Number bits provide an information channel that can be filled with any information. For example, in an exemplary embodiment, the Subcode contains three types of information. The first is a time code wherein a message is carried within the subcode which identifies the time position of each image frame. The second type of information contained in the Subcode is MIDI (Musical Instrument Digital Information) information. The third type of information is film identification information wherein a message, or group of messages are contained in the Subcode which identifies general information regarding the film (such as the film title, manufacture date of the sound track, copyright notice, or format information, etc.). Since the number of Subcode Bitstream Number bits are limited, they are used to accommodate the above described types of information on a priority basis. The time code information having the highest priority for use, followed by the MIDI information and then the film identification information. In an exemplary embodiment, errors in the Subcode Bitstream Number bits monitored by both the Reed-Solomon code and the CRC code. However, since the Subcode Bitstream is an information channel rather than an audio channel, additional error detection and correction capabilities are required for the detector to generate useable information from the channel. The reason being is that when the CRC algorithm throws away audio information due to a faulty Reed-Solomon correction, the missing audio sample can be approximated by considering neighboring audio samples. However, if data on an information channel is eliminated, the missing data cannot be recreated in the same way because neighboring bit values in a bit stream are not related in a predictable manner. The solution is to provide the information that will be carried on the information channel with its own protection method which is specialized to detect and correct errors in an information channel. In an exemplary embodiment of the present invention, the information to be carried on the Subcode Bitstream is first encoded using a standard HDLC (High-level Data Link Controller) algorithm. The HDLC algorithm is an encoding scheme that is specialized for use with communication formats.

The bit positions designated as A-51 through F-64 in each RS block configuration contain fourteen six-bit RS check symbols. The RS check symbols are used to detect and correct up to fourteen errors in each RS block.

The seventh RS block configuration, as shown in FIG. 9, contains a sixteen bit CRC check symbol (Crc−<b>) in bit positions designated as C-48 through F-50. The CRC check symbol represents the remainder of a polynomial division of the data in the superblock. In an exemplary embodiment the polynomial division is computed on all bits in the superblock except for the Synchronization symbol bits, the Complementation Flag bits, the Record Start Flag bit, the RS check symbol bits, the Physical Frame Marker bit, the Event Marker bit and the Record Sequence Count bit. In other words, the division is performed on the Full Sound samples, the Delta Sound samples and the Subcode Bitstream Number bits. The generation polynomial used to perform this operation is $X^{16}+X^{11}+X^5+1$. The purpose of this polynomial division is to detect errors in the superblock which could not be detected or were improperly corrected in the RS block. When each superblock is decoded, a polynomial division is performed on the relevant data and the remainder is compared to the CRC check symbol for that superblock. If the remainders match, then no errors exist in the relevant data. If the remainders do not match, then the entire superblock is regarded as invalid, and the data therein is ignored.

The RS block configurations shown in FIG. 3 through FIG. 9 show the complete data structure for all of the data that is eventually recorded on the film strip to form its sound track. However, before the sound track can be formed, additional manipulation of the data is required. This manipulation enhances the ability of the data reader to align with the sound track and improves the error detection and correction ability of the data decoder. Accordingly, the data must be formatted in the manner described above in order for the decoder to successfully recreate the audio signals stored on the motion picture film.

DATA INTERLEAVE

Audio samples are interleaved to enhance the decoding and reproduction quality of the motion picture playback system. In the motion picture film setting, the data in the sound track is subject to various sources of pollution which cause environmental defects in the data. An environmental defect occurs where the integrity of the film spots is degraded thus causing an error in decoding the data which is encoded in the film spots. This is distinguished from errors caused by the decoding apparatus itself. For example, particles of dust, or other pollutants, may obscure the reading of data from the film. Generally, typical error correction algorithms can correct for errors introduced in this way. However, the power of such an algorithm is not limitless. If too many film spots are obscured in one particular area of the film, the error correction algorithm will not be able to correct each of the defects. This situation may occur in a particularly dusty environment or where the pollutant is sufficiently large to obscure a substantial number of the 14×14 micron film spots. Other examples of where a substantial number of film spots are obscured or destroyed are where the film medium is scratched or where the film has been cut and spliced.

Interleaving helps to prevent a single defect, or a group of localized defects, from destroying the entire analog signal by scattering data to various locations in the sound track. Thus, if one section of the sound track is destroyed, the analog signal can be reconstructed from data that is recorded on the undamaged portion of the sound track. In an embodiment of the present invention, alternate audio samples of each channel are physically displaced from each other, by a predetermined interval, along the length of the sound track.

By way of a summary and overview of the interleaving scheme, there is provided in accordance with the invention a digitally-sound-encoded filmstrip 11 having thereon a succession of image frames 12 spaced apart equally along the length of the filmstrip, and a series of digital sound samples representative of the values of sound in one or more sound channels, such as the channels A-E, for example. The digital sound samples, which are recorded in a track 21 alongside the succession of image frames 12, are characterized in that respective ones of the sound samples representing sound values at successive sampling times are recorded in mutually-remote locations on the filmstrip. Preferably, the locations are sufficiently remote that they occur adjacent different image frames and, as presently practiced, the mutually-remote image frames are separated by two other image frames. In the preferred embodiment of the invention, the digital sound samples are representative of the values of sound in a plurality of channels, such as channels A-E, and are distributed in a series of data blocks (the superblocks 23) extending along the length of the filmstrip. Each superblock 23 contains a separate series of these digital sound samples for each of the set of channels A-E, such as the Full Sound Sample and 31 Delta Sound Samples shown in FIGS. 4-9. Significantly, the samples of each series associated with the respective channels A-E are interleaved with the samples of the others of the series. For example, as shown in the illustrated embodiment, given a plurality of channels AE-E (ignoring in this summary the limited bandwidth subwoofer channel F), successive samples in channel A are A1, A2, A3 ... A31, and channel B are B, B1, B2, B3 ... B31, and so on through E1, E2, E3 ... E31 for channel E. Each of these successive samples in the illustrated example comprises 16 bits in the initial Full Sound Sample, and 12 bits in the subsequent 31 Delta Sound Samples. In keeping with the invention, alternate ones of the samples A1, A2, A3 ... A31, B1, B2, B3 ... B31, etc. are located in one of the superblocks, while interleaved ones of those sound samples are located in a second one of the superblocks remote from the first. Taking channel A as an example, even ones of the sound samples, such as A2, A4, A6, may be located in the first superblock 23, while odd one of the samples, such as A1, A3, A5, that are interleaved with the even ones, may be located in the other superblock.

METHOD OF ACHIEVING INTERLEAVE

Generally the interleave of audio data samples is achieved by storing non-interleaved input data for each audio channel into successive memory locations in a memory device. The data stored in the memory device is then read from the memory in a particular interleaved order. More specifically, the memory device is divided into two halves, each half having equal sized groups of successive memory locations. While data samples are stored in a first half of memory, data samples are recovered, in interleaved order, from a second half of memory. Conversely, when data samples are being stored in the second half of memory, data samples in the first half are being recovered.

The first memory location (i.e. the memory location having the smallest address) is considered to be adjacent to the last memory location in the memory device (i.e. the memory location having the largest address). Therefore, when the addressing of memory locations is described as being successive, such addressing is continuous in that the first memory location is addressed immediately following the final momory location in the memory device.

Figure 12:
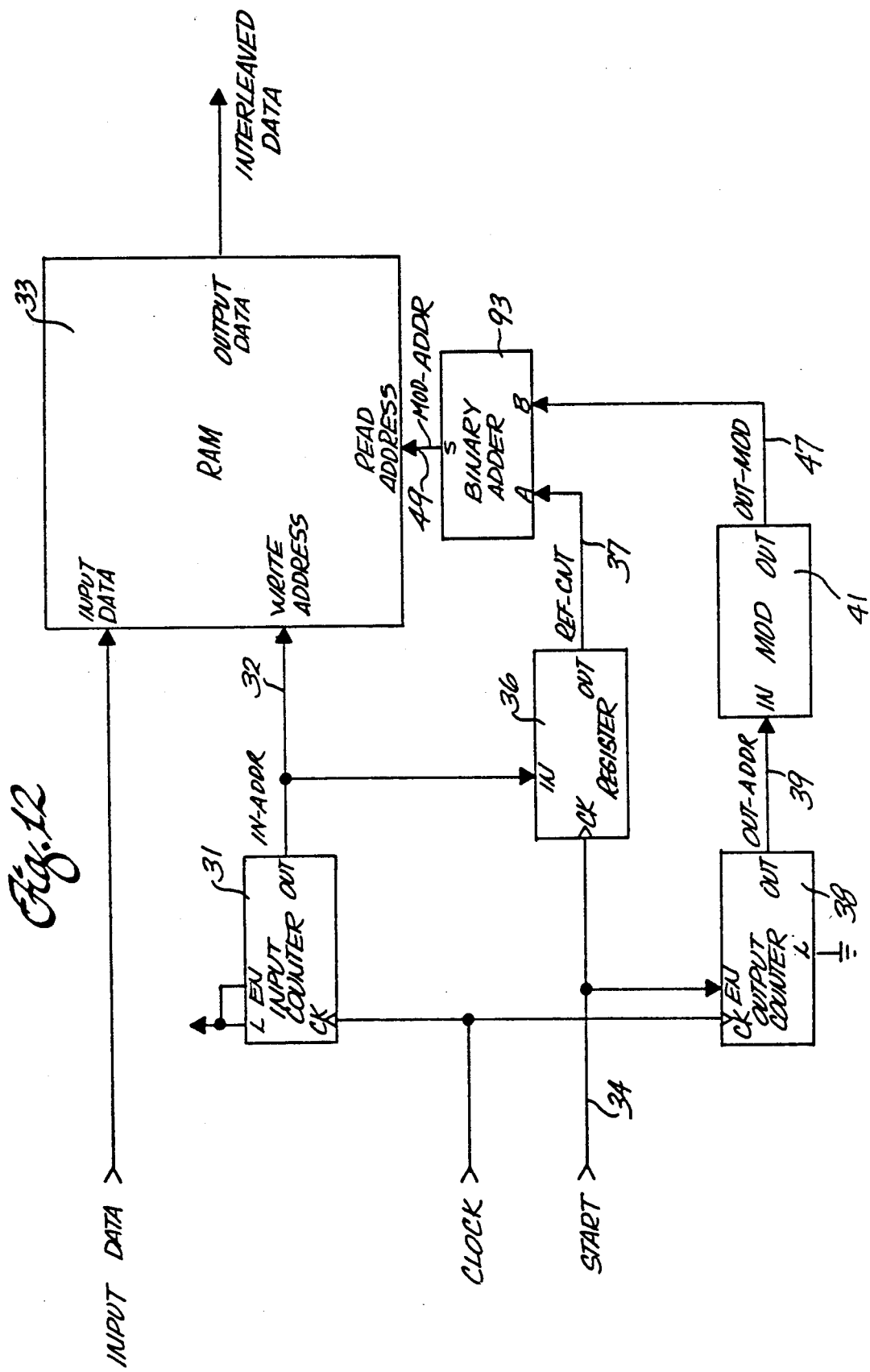
FIG. 12 is a block diagram of an apparatus for interleaving data words.

Referring to FIGS. 12 and 13, an input counter 31, by producing an input address (IN_ADDR) appearing on line 32 in a normal binary sequence, addresses successive memory locations in a memory device 33. Assuming, for purposes of example, that the desired interleave distance between successive audio samples is eight samples, a memory device having thirty-two memory locations is utilized. Therefore the input counter must output a five-bit binary word to address each of the memory locations in the memory device. As shown in FIG. 13, the input address 32 counts from "00" (hex) to "1F" (which corresponds to the thirty-second memory location) and then is begins its count again from "00". Meanwhile, input audio samples are continually written into the successive memory locations addressed by the input counter 31. On the occurrence of a start signal appearing on line 34, the current value of the input address is loaded into a register 36. This value of the input address is saved in the register as the reference count (REF_CNT), which appears on line 37. The start signal identifies which memory address locations constitute which half of the memory and allows the interleaf to synchronize with a particular cue point on the film.

For example, one half (the first half for exemplary purposes) of the address locations begins when the input address equals "09" and ends when the input address equals "18". The other half (the second half for exemplary purposes) begins when the input address equals "19" and ends when the input address equals "08".

Simultaneous to the occurrence of the start signal, an output counter 38 is enabled and begins to count up from "00", in a normal binary sequence and at the same frequency as the input counter, such that when the input address equals the reference count, the output address (OUT_ADDR), appearing on line 39, is "00". Like the input address, the output address counts from "00" (hex) to "1F" and then is begins its count again from "00".

Each count of the output address is modified by a modification circuit 41 wherein the most significant bit of the output address is inverted, the next most significant bit is rotated to the least significant bit position, and the (formally) three least significant bits (not including the bit just placed in the least significant bit position ) are shifted left one bit each.

The result of this modification is shown in the column labeled OUT_MOD (FIG. 13). Note that the output address values that would have normally occurred while the input counter was addressing address locations in the second half of memory occur while the input counter is still addressing the first half of memory. Note also that originally successive values of the output address are separated by eight counts of the input counter, and that originally alternate addresses become successive addresses. For example, the output address sequence "00", "01", "02", "03", "04 . . . is replaced with the OUT_MOD sequence "10", "12", "14", "16". . etc. In other words, the modification interleaves each half of the output address sequence. Therefore, where each half of the sequence has n address values, the halves are interleaved by modifying the original output address sequence of 1, 2, 3 . . . n to produce the sequence 1, 3, 5 . . . n-1, 2, 4, 6 . . . n.

The reference count is added to each value of the OUT_MOD signal by a binary adder 43 to produce an modified address signal (MOD_ADDR), appearing on line 44. The modified address signal is used to access memory locations for the recovery of data stored in those locations. The modified address signal is related to the input address by the same relationship that the OUT_MOD signal is related to the output address. Specifically, while the input counter is writing data into successive memory locations in the first half of the memory device, the output address signal is accessing data from the second half of the memory device in an interleaved fashion. Similarly, while the input counter is writing data into successive memory locations in the second half of the memory device, the modified address signal is accessing data from the first half of the memory device in an interleaved fashion.

In a presently preferred embodiment of the present invention, the interleave distance between two successive audio sample is 256 superblocks. Therefore a memory having 32768 memory locations is required (since each superblock has 32 audio samples). Assuming that only one channel is to be interleaved, the input and output counters require fifteen address lines in order to access each of the memory locations. Further each of the steps required to interleave the input data are identical to the hypothetical situation described above. The modification of the output address is accomplished by inverting the most significant bit of the output address, rotating the second most significant bit to the least significant bit position, and shifting the remaining bits (bits 0 through 12, not including the bit just rotated into the least significant bit position) one bit position to the left.

However, in a more detailed embodiment of the present invention, six audio channels (channels A through F) must be interleaved. This is accomplished by using a memory device having at least 32768 × 6 (196608) memory locations. In the practice of this invention, a memory having 262144 locations (32768 × 8) is used. The memory device is divided into eight channels each having 32768 memory locations. Six of these channels are used to store and interleave the audio data samples, and the remaining two channels are filled arbitrary data (only the six channels are needed to accomplish the interleave of the six channels of audio data samples). The division of the memory into eight channels is accomplished by adding three least significant bits to the address lines shown in FIG. 12 (i.e. IN_ADDR, OUT_ADDR, OUT_MOD and MOD_ADDR). As such, the fifteen most significant bits of each address signal operate exactly as in the previous example (where one channel of audio data samples are interleaved over a distance of 256 superblocks), and the three least significant bits of the address lines select which channel the input data samples are to be written.

Therefore, the input address has eighteen bits The input counter operates by counting sequentially from zero to 262144. However, every group of eight counts corresponds to the writing of one audio data sample per audio channel A through F (plus two channels which are not used by this embodiment of the invention) into corresponding memory locations of each of the eight memory channels. Each group of data samples in corresponding memory locations of the memory channels represent the digitized value of the audio channels taken at the same moment in time. The modification of the output address is accomplished by leaving the three least significant bits alone, inverting the most significant bit (bit 17), rotating the second most significant bit (bit 16) to the fourth least significant bit position (bit position 3) and shifting the remaining bits (bits 3 through 15, not including the bit just rotated to bit position 3) one bit position to the left. The MOD_ADDR signal is created by adding the REF_CNT to each value of the OUT_MOD signal. The final result is the recovery of the stored audio data samples in interleaved form. Since the least three significant bits of the input address is not altered by the modification circuit, data samples for audio channels A through F which represent a common sample time, are recovered together. In other words, the organization of data samples sharing a common sampling time in corresponding channels of memory is preserved throughout the interleaving process.

As a brief summary of present invention, a data format is provided wherein various type of data (such as audio data samples, information channel data, control data and redundant data) is formatted into RS blocks and superblocks as disclosed above. Further, the audio data samples are packed into the given format in an interleaved manner such that successive audio data samples in each audio channel are located in mutually remote locations of the soundtrack.

However, the data as it appears in FIGS. 3 through 9, is not applied directly to the soundtrack on the motion picture film. Rather, some additional processing is required to enhance the readibility of the data from the film. The encoding process used to enhance the data format of the present invention into a form compatable with the motion picture film environment will be described as necessary below.

First, each of the 64 six-bit data symbols in each RS block is converted to an eight-bit word, each eight-bit word having a weight of four (i.e. each eight-bit word has four zero's and four one's). This results in the same RS block and superblock structure on a data symbol by data symbol basis, except that instead of having 64 six-bit data symbols, each RS block has 64 eight-bit data symbols. Further, each eight-bit data symbol RS block has 512 bits (64 eight-bit symbols) and each superblock formed from the eight-bit data symbol RS block contains 3584 bits (7 512-bit RS blocks).

The purpose of the six-bit to eight-bit conversion is three-fold. First, it assures that each row of data in the sound track has approximately half "ones" and half "zeros". This feature enhances the decoders ability to track the data on the sound track. Second, the four-weighted symbols enable the decoder to identify the boundaries of the eight-bit symbols. Third, the four-weight format provides for a first level of error detection and correction when the eight-bit symbols are converted back into six-bit symbols by the decoder.

The six-bit to eight-bit conversion (and subsequent eight-bit to six-bit conversion) is carried out according to the table shown in FIG. 10. Each of the 64 possible six-bit data symbols has an eight-bit code corresponding to it. For example, for any six-bit symbol comprising the bits "010000", it will be converted into an eight-bit symbol comprising the bits "01001110". Note that each of the eight-bit symbols has a weight of four. Also, since there are seventy possible eight-bit symbols having a weight of four, but only sixty-four are required to ensure that each six-bit symbol has a corresponding eight-bit symbol, there is some degree of flexibility in how the table shown in FIG. 10 is created. This flexibility is used to increase the flexibility of the decoding process. Briefly, because of the symmetry of the look-up table, the re-inversion of bits in the Complementation groups may be done before or after converting the eight-bit symbols back to six-bit symbols.

One final manipulation is required to ready the data for recording onto the sound track. This step is dictated by a requirement imposed by the decoding apparatus that data transitions (i.e. transitions between digital values) is to be at least fifty percent in the longitudinal direction of the sound track. More specifically, the number of longitudinally aligned bits in alternating rows of data, as the data appears in the sound track, which have different binary values must be equal to at least half of the number of total bits in the row.

Figure 11:
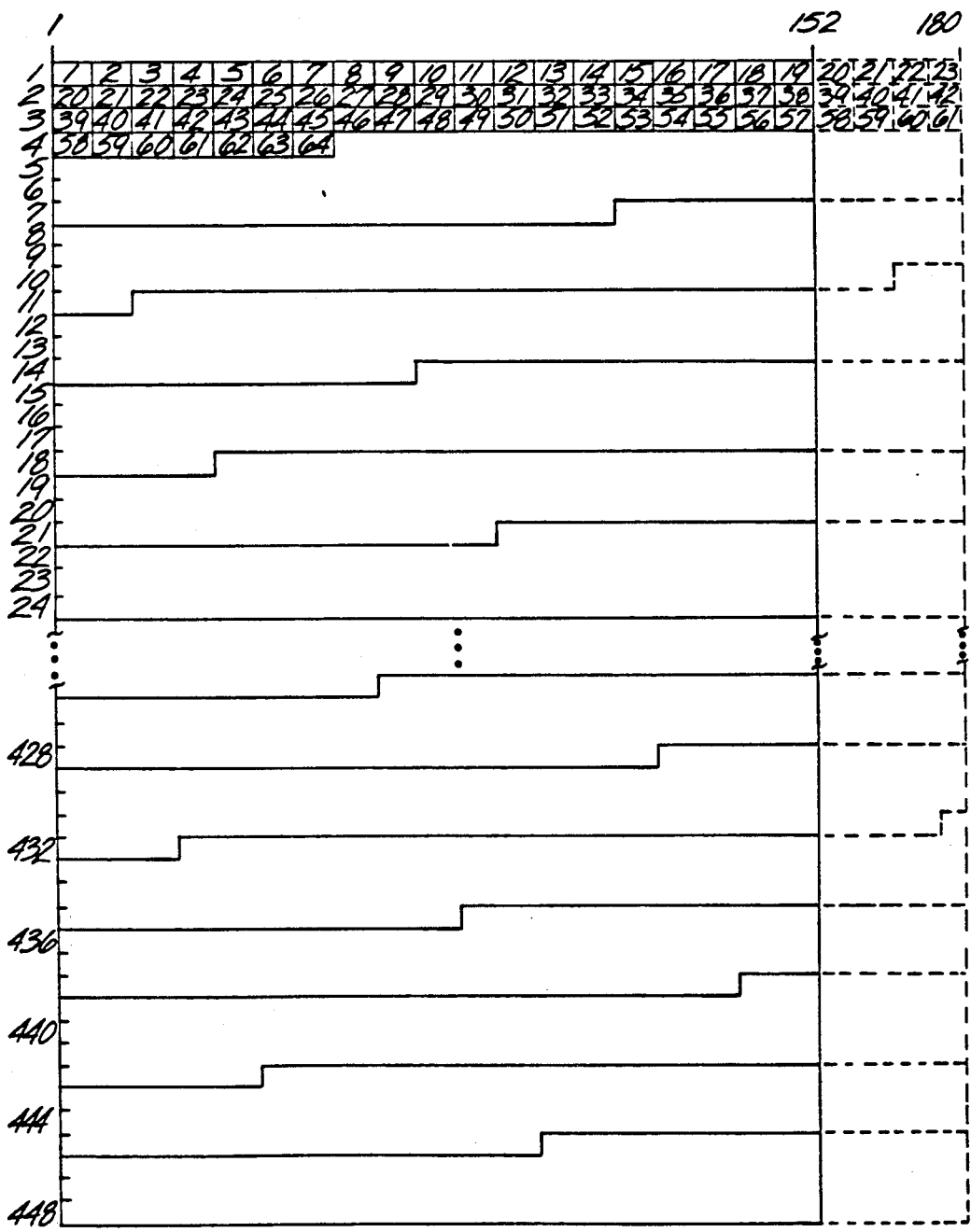
FIG. 11 is a table illustrating the row and column structure of the digital sound track.

This is accomplished by first arranging the data into the row and column structure that it will occupy on the motion picture film. This may be accomplished electronically by storing the data, or a portion of the data, in a memory device. Referring to FIG. 11, the format of the digital sound track is shown. FIG. 11 shows the first 448 rows of data in the sound track. The numbers 1 through 448 along the left side of the figure indicate the first row through the 448th row of data. Each row is 180 bits wide. The numbers 1 through 180 along the top of the figure indicate the bit number (or column number).

The data in the RS blocks is organized on the film strip in the same order that it appears in the RS block. For example, assume that in FIG. 11 the data in the first RS block is going to be recorded in the soundtrack starting at the first row. Then the first eight-bit symbol in the RS block (i.e. the eight-bit symbol that represents the six-bit synchronization symbol in FIG. 3) is recorded in the first eight bit positions (or columns) of the first row of the sound track. The order in which they are recorded are the same as they appear in the RS block. In FIG. 11, this first eight-bit symbol is shown as a block in the far left position of row number one. The block is designated by the number "1". Continuing with the example, the second eight-bit symbol in the first RS block is recorded in the $9^{th}$ to $16^{th}$ bit positions (or columns) in the first row of the sound track. This second eight-bit symbol is represented in FIG. 11 by the second block (from the left) in the first row (i.e. the block designated by the number "2").

This pattern of sequentially recording the eight-bit symbols from the RS block end-to-end in the sound track continues until the entire first row is filled with data. Note that since there are 180 bits per row, only the first half of the last eight-bit symbol appears in the first row. Referring to FIG. 11, only the first four bits of the $23^{rd}$ eight-bit symbol in the first RS block fits in the first row of the sound track.

In the second row of the sound track, instead of beginning where the first row left off, the $20^{th}$ eight-bit symbol of the RS block is recorded in the first eight bit positions in the row. The next eight bit positions are filled with the $21^{st}$ eight-bit symbol of the RS block. This pattern continues, as in the first row, until all 180 bit positions in the row have been filled.

It is important to note that since the second row of film bits started on the far left side with the $20^{th}$ symbol from the RS block, the last twenty-eight film bits in the first row of film bits are identical to the first twenty-eight films bits of the second row. This pattern continues down the length of the entire sound track wherein the first twenty-eight film bits of each row of data is redundant to the last twenty-eight film bits in the immediately previous row. Thus all of the data in the RS blocks appears in the first 152 bit positions of the sound track, and the $153^{rd}$ to $180^{th}$ bit positions (the last twenty-eight film bits in each row) contains redundant data.

Continuing with the current example, data is recorded in the third row of the sound track beginning with the $39^{th}$ symbol of the RS block, and successive symbols from the RS block are recorded end-to-end until the row is filled. The remainder of the first RS block, (the $58^{th}$ through the $64^{th}$ symbol) is recorded in the forth row, again beginning in the far left side of the row as shown in FIG. 11. Immediately following the last symbol of the first RS block, the first symbol of the second RS block is recorded, and the remainder of the second RS block is recorded in the manner described above. This process is used to record each of the RS blocks running the entire length of the sound track.

It should be understood that although a description of the recording process has just been described, the data is not immediately recorded after the six-bit symbol to eight-bit symbol conversion has been completed. Rather, the data is organized into the sound track format to facilitate the final encoding step, that step being maximizing data transitions in the longitudinal direction of the sound track.

Data transitions are maximized by inverting families of bits in each RS block. More specifically, transitions are maximized by inverting one or more of the complementation groups, A, B or C, in each RS block. When a complementation group is said to be inverted, each of the bits in each eight-bit symbol of the complementation group is inverted.

The Complementation groups are inverted according to an algorithm which analyzes all of the possible combinations in which the Complementation groups could be inverted (i.e., none, some or all of the Complementation groups are inverted). The algorithm looks at the data, physically formatted in the form which it will appear on the sound track, in each of the possible complementation combinations and counts the number of longitudinally aligned bits in alternate rows of data that have opposite values for each combination. The combination selected is that which maximizes this number. Each row of data is analyzed in this manner. The data in each RS block is inverted according to the results and the Complementation Flag Group bits of each RS block are set to indicate which of the Complementation groups have been inverted.

Once complementation has been accomplished, the data is in its final format and is ready to be recorded onto the film strip. The data is recorded on the sound track in the manner described above.

The preceding description has been presented with reference to the presently preferred embodiment to the invention shown in the drawings. Those skilled in the art and technology to which this invention pertains will appreciate that alterations and changes in the described structures can be practiced without departing from the spirit, principles and scope of this invention.

What is claimed is:

1. A digitally-sound-encoded filmstrip having digital data recorded thereon representative of a data format wherein the format comprises:

a plurality of data fields, each field having recorded therein interleaved digital data representative of sampled audio signals wherein adjacent samples are recorded in mutually remote data fields, and each field further having recorded therein digital data representative of first level error corrective checkwords for attempted correction of errors in the field; and a plurality of data blocks, each block having a plurality of data fields, wherein mutually remote fields are located in different blocks, and at least one data field in each block has digital data representative of second level error detecting checkwords redundant to data throughout the data block for invalidating the data from the block upon error detection, thereby allowing invalidation of a block without loss of adjacent samples.

2. A digitally-sound-encoded film strip as recited in claim 1 wherein the first level error corrective checkwords comprise Reed-Solomon formatted checkwords for facilitating the detection and correction of data errors upon decoding of the data format.

3. A digitally-sound-encoded film strip as recited in claim 2 wherein the second level error corrective checkwords comprise cyclic-redundancy-code formatted checkwords for facilitating the detection of data errors and Reed-Soloman mis-corrections in each data block.

4. A digitally-sound-encoded film strip as recited in claim 1 wherein each data block further comprises at least one data field having digital data representative of a sequence count word uniquely identifying that particular data block.

5. A digitally-sound-encoded filmstrip as recited in claim 1 wherein each data field having digital data representative of an absolute position pointer.

* * * * *